US012511986B2

(12) United States Patent
Sasayama et al.

(10) Patent No.: US 12,511,986 B2
(45) Date of Patent: Dec. 30, 2025

(54) RISK INFORMATION PROVISION DEVICE, RISK INFORMATION PROVISION SYSTEM, RISK INFORMATION PROVISION METHOD, AND RISK INFORMATION PROVISION PROGRAM

(71) Applicant: Asahi Kasei Microdevices Corporation, Tokyo (JP)

(72) Inventors: Kengo Sasayama, Tokyo (JP); Takaaki Furuya, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 31 days.

(21) Appl. No.: 18/191,836

(22) Filed: Mar. 28, 2023

(65) Prior Publication Data

US 2023/0351877 A1  Nov. 2, 2023

(30) Foreign Application Priority Data

Mar. 31, 2022 (JP) .................................. 2022-060114
Mar. 20, 2023 (JP) .................................. 2023-044585

(51) Int. Cl.
G08B 21/12 (2006.01)
F24F 11/36 (2018.01)
G08B 21/04 (2006.01)

(52) U.S. Cl.
CPC ............. *G08B 21/12* (2013.01); *F24F 11/36* (2018.01); *G08B 21/0492* (2013.01)

(58) Field of Classification Search
CPC ........ G08B 21/12; G08B 21/14; G08B 21/16; G08B 21/0492; G05B 15/02;
(Continued)

(56) References Cited

U.S. PATENT DOCUMENTS 6,073,455 A   6/2000 Masako
9,182,751 B1  11/2015 Reeder
(Continued)

FOREIGN PATENT DOCUMENTS

CN   104390310 A   3/2015
CN   106325067 A   1/2017
(Continued)

OTHER PUBLICATIONS

Masahiro Inazawa et al., "Development of Biological Information Measurement Head Mounted Display for User's Arousal Estimation during VR Experience", TVRSJ vol. 24 No.4 pp. 377-388, 2019.
(Continued)

*Primary Examiner* — Adnan Aziz

(57) ABSTRACT

Provided is a risk information provision device including: an information acquisition unit configured to acquire risk information related to a risk depending on a status of leakage of a refrigerant in a determination target and risk handling information for handling the risk, wherein the status is determined on a basis of a concentration of the refrigerant in the determination target; a provision unit configured to provide at least one of the risk information or the risk handling information; and a date information acquisition unit configured to acquire date information of a date on which at least one of the risk information or the risk handling information is acquired. The risk handling information includes recipient information related to one or more recipients that receive the risk information. The provision unit is configured to provide at least one of the risk information or the date information to the one or more recipients.

12 Claims, 13 Drawing Sheets

(58) Field of Classification Search
CPC .. G01N 33/0075; G01D 2204/22; F24F 11/36; F24F 11/52; F24F 11/56; F24F 11/64; F24F 11/70; F24F 11/88; F24F 2110/65; F25B 2500/222

See application file for complete search history.

(56) References Cited

U.S. PATENT DOCUMENTS

| | | |
|---|---|---|
| 10,032,343 B2 | 7/2018 | Fadell |
| 10,217,068 B1 | 2/2019 | Davis |
| 11,342,051 B1 | 5/2022 | Jain |
| 11,649,977 B2 | 5/2023 | He |
| 11,913,654 B1 | 2/2024 | Stamatakis |
| 2004/0236240 A1 | 11/2004 | Kraus |
| 2006/0122738 A1 | 6/2006 | Yamada |
| 2007/0043576 A1 | 2/2007 | Kumamoto |
| 2008/0250661 A1 | 10/2008 | Kou |
| 2010/0014626 A1 | 1/2010 | Fennell |
| 2010/0292860 A1 | 11/2010 | Komiya |
| 2012/0197462 A1 | 8/2012 | Sakai |
| 2014/0324527 A1 | 10/2014 | Kulkarni |
| 2016/0178229 A1* | 6/2016 | Chen .................. F24F 11/30 62/126 |
| 2017/0003258 A1 | 1/2017 | Krauss |
| 2017/0176187 A1 | 6/2017 | Ishihama |
| 2017/0208493 A1 | 7/2017 | Masson |
| 2017/0248564 A1 | 8/2017 | Miyajima |
| 2017/0367618 A1 | 12/2017 | Ricciardelli |
| 2019/0072291 A1 | 3/2019 | Kamijo |
| 2019/0086877 A1* | 3/2019 | Norton ................ G05B 13/026 |
| 2019/0122759 A1 | 4/2019 | Wakimoto |
| 2019/0170384 A1* | 6/2019 | McQuade ............ G05B 15/02 |
| 2019/0244507 A1 | 8/2019 | Uruno |
| 2020/0049361 A1* | 2/2020 | Minamida ............ F25B 49/02 |
| 2020/0124306 A1 | 4/2020 | Kowald |
| 2020/0187357 A1 | 6/2020 | Park |
| 2020/0227159 A1 | 7/2020 | Boisvert |
| 2020/0248919 A1* | 8/2020 | Green ................. G05B 23/027 |
| 2020/0315548 A1 | 10/2020 | Sato |
| 2020/0348038 A1 | 11/2020 | Risbeck |
| 2020/0383172 A1 | 12/2020 | Mccracken |
| 2020/0393159 A1 | 12/2020 | Takayanagi |
| 2021/0018210 A1* | 1/2021 | Nasis .................. F24F 11/65 |
| 2021/0043330 A1 | 2/2021 | Hiroko |
| 2021/0053413 A1 | 2/2021 | Noh |
| 2021/0072713 A1 | 3/2021 | Matsumoto |
| 2021/0094686 A1 | 4/2021 | Metzner |
| 2021/0164678 A1* | 6/2021 | Delgoshaei ............ F24F 11/52 |
| 2021/0222901 A1 | 7/2021 | Scaramelli |
| 2021/0247086 A1 | 8/2021 | Sasaki |
| 2021/0409396 A1 | 12/2021 | Funayama |
| 2022/0003581 A1 | 1/2022 | Fox |
| 2022/0005609 A1 | 1/2022 | Morizumi |
| 2022/0040356 A1 | 2/2022 | Ichihara |
| 2022/0110592 A1 | 4/2022 | Shigyo |
| 2022/0128253 A1 | 4/2022 | Suzuki |
| 2022/0128428 A1* | 4/2022 | Clark ................. G05D 7/0635 |
| 2022/0268492 A1* | 8/2022 | Yajima ................ F25B 13/00 |
| 2022/0288520 A1 | 9/2022 | Suzuki |
| 2022/0399105 A1 | 12/2022 | Wagner Block |
| 2022/0404048 A1* | 12/2022 | Delgoshaei ............ F24F 11/86 |
| 2023/0182766 A1 | 6/2023 | Chou |
| 2023/0235907 A1* | 7/2023 | DeWald ................ F24F 11/58 62/129 |
| 2023/0272928 A1 | 8/2023 | Livchak |
| 2024/0060667 A1* | 2/2024 | Minami ............... F25B 49/02 |

FOREIGN PATENT DOCUMENTS

| | | | |
|---|---|---|---|
| CN | 106384482 A | 2/2017 | |
| CN | 108549307 A | 9/2018 | |
| CN | 110044007 A | 7/2019 | |
| CN | 110887166 A | * 3/2020 | ............. F24F 11/36 |
| CN | 110887807 A | 3/2020 | |
| CN | 111523750 A | 8/2020 | |
| EP | 2119965 A1 | 11/2009 | |
| EP | 3751209 A1 | 12/2020 | |
| JP | 2002056467 A | 2/2002 | |
| JP | 2002169935 A | 6/2002 | |
| JP | 2004196063 A | 7/2004 | |
| JP | 2005056330 A | 3/2005 | |
| JP | 2006036012 A | 2/2006 | |
| JP | 2007213470 A | 8/2007 | |
| JP | 2008052608 A | 3/2008 | |
| JP | 2008304124 A | 12/2008 | |
| JP | 2009230485 A | 10/2009 | |
| JP | 2010093616 A | 4/2010 | |
| JP | 2010121953 A | 6/2010 | |
| JP | 2011162096 A | 8/2011 | |
| JP | 2012008713 A | 1/2012 | |
| JP | 2012128469 A | 7/2012 | |
| JP | 2015018517 A | 1/2015 | |
| JP | 5835734 B2 | 12/2015 | |
| JP | 2016031382 A | 3/2016 | |
| JP | 2016081090 A | 5/2016 | |
| JP | 2016195639 A | 11/2016 | |
| JP | 2017053509 A | 3/2017 | |
| JP | 2017151698 A | 8/2017 | |
| JP | 2018120468 A | 8/2018 | |
| JP | 2018206005 A | 12/2018 | |
| JP | 2018206302 A | 12/2018 | |
| JP | 6557853 B2 | 8/2019 | |
| JP | 2020024586 A | 2/2020 | |
| JP | 2020067939 A | 4/2020 | |
| JP | 2020071621 A | 5/2020 | |
| JP | 2020119303 A | 8/2020 | |
| JP | 2020144628 A | 9/2020 | |
| JP | 2020154976 A | 9/2020 | |
| JP | 2020159742 A | 10/2020 | |
| JP | 2021196093 A | 12/2021 | |
| JP | 7217824 B1 | 2/2023 | |
| JP | 2023137792 A | * 9/2023 | |
| KR | 20160104940 A | 9/2016 | |
| KR | 20200060865 A | 6/2020 | |
| KR | 20200105093 A | 9/2020 | |
| KR | 20210012797 A | 2/2021 | |
| WO | 2007057966 A1 | 5/2007 | |
| WO | 2019130452 A1 | 7/2019 | |
| WO | 2020144247 A1 | 7/2020 | |
| WO | 2020217616 A1 | 10/2020 | |
| WO | 2022065066 A1 | 3/2022 | |

OTHER PUBLICATIONS

Guanzhong, "Construction and management of computer room", Shaanxi Science and Technology Publishing, pp. 553-554, Jun. 30, 1993 See citation in Non-Patent Literature #3.

Office Action issued for related Chinese Application 202210307504.2, issued by The State Intellectual Property Office of People's Republic of China on Jun. 13, 2023.

* cited by examiner

RISK INFORMATION PROVISION DEVICE, RISK INFORMATION PROVISION SYSTEM, RISK INFORMATION PROVISION METHOD, AND RISK INFORMATION PROVISION PROGRAM

The contents of the following Japanese patent application(s) are incorporated herein by reference:
2022-060114 filed in JP on Mar. 31, 2022
2023-044585 filed in JP on Mar. 20, 2023

BACKGROUND

1. Technical Field

The present invention relates to a risk information provision device, a risk information provision system, a risk information provision method, and a risk information provision program.

2. Related Art

Patent Document 1 describes that "in an air conditioning unit, it is easy to grasp the installation location of a leak detection sensor or the like, and maintenance such as replacement and repair is improved" (ABSTRACT).

CITATION LIST

Patent Document

Patent Document 1: International Publication No. 2019/130452

DESCRIPTION OF EXEMPLARY EMBODIMENTS

Hereinafter, the present invention will be described through embodiments of the present invention, but the following embodiments do not limit the present invention according to claims. In addition, not all combinations of features described in the embodiment are essential to the solution of the invention.

Figure 1:
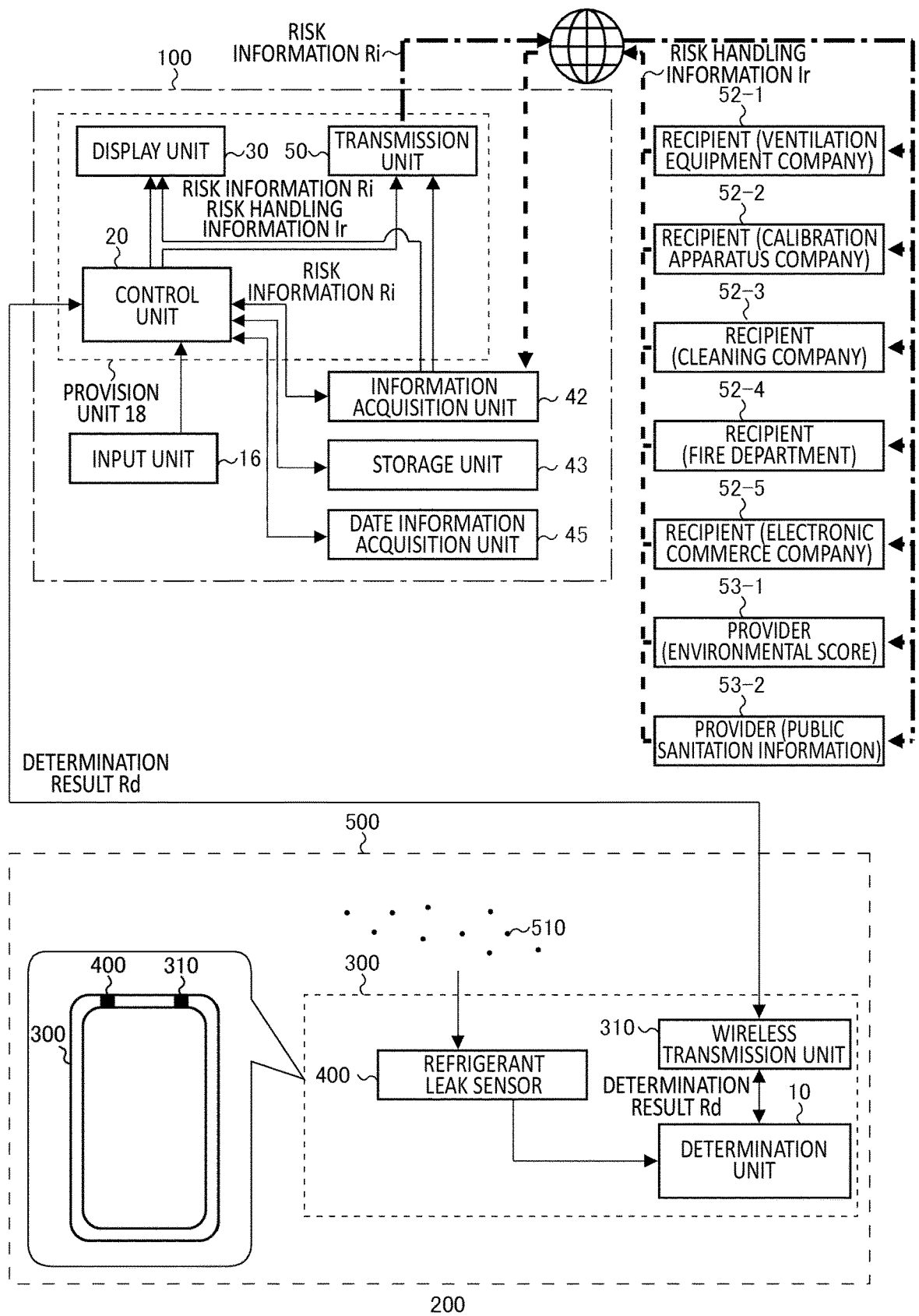
FIG. 1 is a block diagram illustrating an example of a risk information provision system 200 according to an embodiment of the present invention.

FIG. 1 is a block diagram illustrating an example of a risk information provision system 200 according to an embodiment of the present invention. The risk information provision system 200 includes a risk information provision device 100 and a refrigerant leak detection unit 300. The refrigerant leak detection unit 300 has a refrigerant leak sensor 400. The refrigerant leak detection unit 300 is installed in an air conditioning unit. For example, the air conditioning unit is an air conditioner or a vending machine. The refrigerant leak detection unit 300 circulates a refrigerant for heat exchange in the air conditioning unit.

A refrigerant 510 is, for example, a combustible gas. For example, the refrigerant leak sensor 400 is at least one of a combustible gas sensor that detects combustible gas concentration, an oil sensor, a frost sensor, an abnormal sound sensor, or a power sensor.

A determination target 500 is an object which is a target of determination on the leakage of the refrigerant 510. The object is, for example, an air conditioning unit. The object may be a given outdoor space. The refrigerant leak sensor 400 measures the concentration of the refrigerant 510 contained in the air present in the object.

If the determination target 500 is an air conditioning unit, the refrigerant leak detection unit 300 may be installed in a piping unit, an indoor unit, an outdoor unit, or the like of the air conditioning unit.

The status of the leakage of the refrigerant 510 in the determination target 500 is assumed to be a status Sd. For example, the status of the leakage of the refrigerant is the status of the concentration of the refrigerant 510. The status Sd is determined on the basis of the concentration of the refrigerant 510 in the determination target 500. The status Sd refers to the degree of concentration of the refrigerant 510 in the determination target 500. For example, the status Sd refers to whether the degree of concentration of the refrigerant 510 in the determination target 500 is normal, whether the concentration of the refrigerant 510 in the determination target 500 is changing, whether the concentration is approaching an abnormal value, or the like. The determination result for the determined status Sd is referred to as a determination result Rd.

In this example, the refrigerant leak detection unit 300 includes a determination unit 10. In this example, the determination unit 10 determines the status Sd of the concentration of the refrigerant 510 in the determination target 500 on the basis of the concentration of the refrigerant 510 in the determination target 500. The determination unit 10 may output the determination result Rd. The determination unit 10 may be a central processing unit (CPU).

In this example, the refrigerant leak detection unit 300 includes a wireless transmission unit 310. In this example, the wireless transmission unit 310 transmits the determination result Rd, which is from the determination unit 10, to the risk information provision device 100.

The risk information provision device 100 includes an information acquisition unit 42, a provision unit 18, and a date information acquisition unit 45. The risk information provision device 100 may include a storage unit 43. The information acquisition unit 42 acquires risk information and risk handling information. The risk information is referred to as risk information Ri and the risk handling information is referred to as risk handling information Ir. The information acquisition unit 42 may acquire the determination result Rd.

The date information acquisition unit 45 acquires the date information of the date on which at least one of the risk information Ri or the risk handling information Ir is acquired. The date information is referred to as date information Id. For example, the date information Id is the year and date on which at least one of the risk information Ri or the risk handling information Ir is acquired. The date information Id may be time at which at least one of the risk information Ri or the risk handling information Ir is acquired.

The risk information Ri is information related to a risk depending on the status Sd of the leakage of the refrigerant 510 in the determination target 500. The risk information Ri may include information related to temporal changes in the concentration of the refrigerant 510. For example, the information related to the risk refers to information such as whether the concentration of the refrigerant 510 is changing in the determination target 500 or whether the concentration is approaching an abnormal value.

The risk information Ri may include information related to the type of the refrigerant 510. The information related to the type of the refrigerant 510 refers to information related to which of hydrofluorocarbon (HFC), hydrofluoroolefin (HFO), and the like the refrigerant 510 belongs to. The risk information Ri may include risk information related to the type of the refrigerant 510, a safety in the case of the leakage of the refrigerant 510, the effect of the refrigerant 510 on the environment, and the like. The risk information Ri may include information related to the leakage amount of the refrigerant 510 from the determination target 500 or the leakage location of the refrigerant 510 in the determination target 500. The risk information Ri may include information predicted from the past failure history, the maintenance history, or the like of the determination target 500. If the determination target 500 is an air conditioning unit, the risk information Ri may include risk information predicted based on an air conditioning unit having the same model number as a target air conditioning unit. The risk information Ri may include risk information predicted based on the failure history of an apparatus having a function similar to that of the air conditioning unit.

The risk handling information Ir is information for handling a risk depending on the status Sd. For example, the information for handling the risk refers to at least one of information that prompts the user of the risk information provision device 100 to take actions for handling the risk, information such as laws related to Fluorocarbon Emissions Control Act, information such as the environmental score related to the refrigerant 510, the contact information of an air conditioning repair company that resolves an abnormal value when the concentration of the refrigerant 510 in the determination target 500 is approaching the abnormal value, advertisement information, the available date and time of the air conditioning repair company or an air conditioning unit manufacturer, the information of an emergency treatment method for the air conditioning unit, or the like. The risk handling information Ir may include the information for reducing the risk. The risk handling information Ir may include information related to at least one of a purchaser, a cost, a delivery date, or the like when purchasing an air conditioning unit and expendable parts. Even if there is no abnormality in the leakage amount of the refrigerant 510 from the air conditioning unit, when there is a treatment method predicted from the failure history or the like of an apparatus similar to the air conditioning unit, the risk handling information Ir may include information related to the treatment method. The information acquisition unit 42 may acquire the risk handling information Ir via the Internet line.

The provision unit 18 provides at least one of the risk information Ri or the risk handling information Ir. In this example, the provision unit 18 includes a control unit 20, a display unit 30, and a transmission unit 50. The control unit 20 may be a central processing unit (CPU). In this example, the display unit 30 displays at least one of the risk information Ri or the risk handling information Ir. The display unit 30 may display at least one of the risk information Ri or the risk handling information Ir in a form that can be visually recognized by a human. The display unit 30 is, for example, a display, a monitor, or the like. The risk information provision device 100 may be a computer including the CPU, the display, a memory, an interface, and the like. The risk information provision device 100 may be a portable computer such as a tablet.

The control unit 20 may control the display unit 30 so that the display unit 30 displays at least one of the risk information Ri or the risk handling information Ir. In this example, the provision unit 18 causes the display unit 30 to display at least one of the risk information Ri or the risk handling information Ir to provide at least one of the risk information Ri or the risk handling information Ir to the user of the risk information provision device 100. In this way, the user of the risk information provision device 100 can know at least one of the risk information Ri or the risk handling information Ir.

The control unit 20 may control the transmission unit 50 so that the transmission unit 50 transmits the risk information Ri. In this example, the provision unit 18 causes the transmission unit 50 to transmit the risk information Ri to provide the risk information Ri to the recipient of the risk information Ri. The recipient of the risk information Ri is referred to as a recipient 52. The recipient 52 may be a third party that is not the owner of the risk information provision device 100. The provision unit 18 may wirelessly provide the risk information Ri to the recipient 52 via, for example, the Internet line. The provision unit 18 may provide the risk information Ri to a plurality of recipients 52. In this way, the recipient 52 can know the risk information Ri.

The provision unit 18 provides at least one of the risk information Ri or the date information Id to one or a plurality of recipients 52. In this example, the provision unit 18 provides the risk information Ri to the plurality of recipients 52. In this example, the recipient 52-1 is an air conditioning repair company, the recipient 52-2 is an apparatus manufacturer, the recipient 52-3 is a refrigerant distributor, the recipient 52-4 is the seller of the apparatus, and the recipient 52-5 is an electronic commerce company. The electronic commerce company is, for example, a company selling goods through the Internet. These recipients are merely examples. For example, the recipient 52 may be a company that operates an application such as air quality management or may be an insurance company.

In this example, the provider of the risk handling information Ir is referred to as a provider 53. The provider of the risk handling information Ir refers to the provision source of the risk handling information Ir. The information acquisition unit 42 may acquire the risk handling information Ir provided by the provider 53. The information acquisition unit 42 may acquire pieces of the risk handling information Ir provided by a plurality of providers 53. In this example, a provider 53-1 is the provider of the environmental score, and a provider 53-2 is the provider of the information of Fluorocarbon Emissions Control Act. In this example, the recipient 52 also provides the risk handling information Ir.

The provision unit 18 may provide the risk information Ri to the recipient 52 and the provider 53. The information acquisition unit 42 may acquire the risk handling information Ir provided by the provider 53 and the recipient 52. The provision unit 18 may provide at least one of the risk information Ri or the risk handling information Ir to at least one recipient 52 of the plurality of recipients 52 on the basis of the information related to the temporal change in the concentration of the refrigerant 510. The provision unit 18 may provide at least one of the risk information Ri or the risk handling information Ir to at least one recipient 52 of the plurality of recipients 52 on the basis of the information related to the type of the refrigerant 510. The provision unit 18 may provide at least one of the risk information Ri or the risk handling information Ir to at least one recipient 52 of the plurality of recipients 52 on the basis of the information related to the concentration of the refrigerant 510. The leakage amount of the refrigerant 510 may be calculated on the basis of the concentration of the refrigerant 510. The provision unit 18 may provide at least one of the risk information Ri or the risk handling information Ir to at least one recipient 52 of the plurality of recipients 52 on the basis of the information related to the leakage amount of the refrigerant 510.

The risk information provision device 100 may further include an input unit 16. The input unit 16 inputs input information to the provision unit 18. The input unit 16 is, for example, a mouse, a keyboard, and the like. For example, the input unit 16 may be a voice input function such as a microphone.

The risk handling information Ir may include recipient information related to one or a plurality of recipients 52. The recipient information is referred to as recipient information Isp. For example, the recipient information Isp is information indicating that the recipient 52-1 is an air conditioning repair company.

Input information related to risk handling may be input on the basis of the risk handling information Ir. The provision unit 18 may provide the risk information Ri to at least one of the recipient 52 or the provider 53 on the basis of the input information. The input information may be information for handling the risk. The input information may be input by the user of the risk information provision device 100, or may be automatically input by an electronic apparatus which is in the state capable of communicating with the risk information provision device 100.

The risk information provision device 100 may include a display unit 30 having an input function instead of the input unit 16. The display unit 30 is, for example, a touch panel. If the display unit 30 is a touch panel, the user of the risk information provision device 100 may input the handling of the risk via the display unit 30. The display unit 30 may display a plurality of recipients 52. If the display unit 30 displays a plurality of recipients 52, the plurality of recipients 52 may be given priority for the order of display, the size of the display, or the like. For example, the order of displayed companies may be changed for each concentration range of the refrigerant 510, and a specific company may be preferentially displayed at the top.

Inputting handling a risk on the basis of the risk handling information Ir means that a request for repair to the recipient 52-1 is input in order to resolve the risk (for example, the abnormal value of the concentration of the refrigerant 510 when the risk handling information Ir is advertisement information provided by the recipient 52-1 (air conditioning repair company). Inputting to handle the risk on the basis of the risk handling information Ir may mean that the user of the risk information provision system 200 notifies the recipient 52-1 of the risk. The risk may include a risk based on an accident related to the risk information provision system 200 or a risk based on the abnormality of the leakage amount of the refrigerant 510. Inputting handling the risk on the basis of the risk handling information Ir means that a request for repair to the recipient 52-1 is input when the risk handling information Ir is the provider 53-1. The provider 53-1 may include a fire department or an emergency security window.

The additional risk information related to the risk in the determination target 500 and related to the risk depending on the status Sd is referred to as additional risk information Ria. As described above, the status Sd is the status of the leakage of the refrigerant 510 in the determination target 500.

As described above, the status Sd is determined on the basis of the concentration of the refrigerant 510 in the determination target 500. The additional risk information Ria may be risk information noticed by the user of the risk information provision device 100 in addition to the status Sd determined on the basis of the concentration of the refrigerant 510. For example, the risk information is information indicating that, when the user recognizes that the refrigerant 510 is leaking in the determination target 500, the refrigerant 510 that affects global warming is leaking from the air conditioning unit.

The additional risk handling information related to the handling of the risk in the determination target 500 and related to the handling of the risk depending on the status Sd is referred to as additional risk handling information Ira. The additional risk handling information Ira may be the risk handling information realized by the user of the risk information provision device 100 besides the risk handling information Ir acquired by the information acquisition unit 42. For example, the risk handling information is information indicating that, when only advertisement information of the recipient 52-1 (air conditioning repair company) is displayed on the display unit 30 even though the user recognizes that the refrigerant 510 is leaking in the determination target 500, the risk information Ri is also provided to the recipient 52-4 (the seller of the apparatus).

The provision unit 18 may provide at least one of the risk information Ri or the risk handling information Ir on the basis of at least one input information of the additional risk information Ria or the additional risk handling information Ira input by the input unit 16. On the basis of at least one input information of the additional risk information Ria or the additional risk handling information Ira input by the input unit 16, the control unit 20 may control the display unit 30 so that the display unit 30 displays at least one of the risk information Ri or the risk handling information Ir.

The provision unit 18 may provide at least one of the risk information Ri or the risk handling information Ir on the basis of the provision history, which is provided by the provision unit 18, of the risk information Ri and the risk handling information Ir. The storage unit 43 may store the provision history of the risk information Ri and the risk handling information Ir that are provided by the provision unit 18.

The risk information provision device 100 may not include the storage unit 43. If the risk information provision device 100 includes no storage unit 43, the provision history of the risk information Ri and the risk handling information Ir that are provided by the provision unit 18 may be stored in a cloud server or a server placed outside the risk information provision device 100.

The provision history of the risk information Ri includes the histories of information related to the risk depending on the status Sd of the leakage of the refrigerant 510 in the determination target 500 and information regarding which recipient 52 or provider 53 is provided with the risk information Ri. The provision history of the risk handling information Ir includes the information for handling the risk depending on the status Sd and the information indicating which of the recipient 52 or the provider 53 has provided the risk handling information Ir. Therefore, the provision unit 18 provides the risk handling information Ir on the basis of the provision history of the risk information Ri and the risk handling information Ir, so that the provision unit 18 can provide the risk handling information Ir having a high probability of being most appropriate. The provision unit 18 provides the risk information Ri on the basis of the provision history so that the provision unit 18 can provide the risk information Ri having a high probability of being most appropriate.

The risk handling information Ir may include the information related to the apparatus for handling the risk. The apparatus is referred to as an apparatus Ap. For example, the apparatus Ap for handling the risk is, when the concentration of the refrigerant 510 in the determination target 500 is approaching an abnormal value, a ventilation apparatus for resolving the abnormal value.

The information acquisition unit 42 may further acquire the information, which is provided by the recipient 52, related to the apparatus Ap. The provision unit 18 may provide at least one of the risk information Ri or the risk handling information Ir on the basis of the acquisition history, which is acquired by the information acquisition unit 42, of the information related to the apparatus Ap. The storage unit 43 may store the acquisition history of the information related to the apparatus Ap and acquired by the information acquisition unit 42.

The acquisition history of the information related to the apparatus Ap is likely to reflect the acquisition tendency of the apparatus Ap by the user of the risk information provision device 100. The acquisition history is likely to include the purchase history of the apparatus Ap of the user. Therefore, the provision unit 18 provides the risk handling information Ir on the basis of the acquisition history of the information related to the apparatus Ap, so that the provision unit 18 can provide the risk handling information Ir having a high probability of being most appropriate. The provision unit 18 provides the risk information Ri on the basis of the acquisition history, so that the provision unit 18 can provide the risk information Ri having a high probability of being most appropriate.

The provision unit 18 may provide at least one of the risk information Ri or the risk handling information Ir on the basis of the browsing history, which is acquired by the information acquisition unit 42, of the information related to the apparatus Ap. The browsing history of the information related to the apparatus Ap is the history of the user of the risk information provision device 100 browsing, through the display unit 30, the information related to the apparatus Ap and displayed on the display unit 30. The browsing history is also likely to reflect the acquisition tendency of the apparatus Ap by the user of the risk information provision device 100. The storage unit 43 may further store the browsing history of the information related to the apparatus Ap and acquired by the information acquisition unit 42.

The information acquisition unit 42 may acquire the risk information Ri and the risk handling information Ir on the basis of the date information Id acquired by the date information acquisition unit 45. The date information Id may reflect the purchasing trends of the apparatus Ap by the user of the risk information provision device 100. The case where the date information Id reflects the purchasing trends by the user is, for example, a case where the date information Id reflects the seasonal characteristics of the purchasing trends by the user. For example, in March, the apparatus Ap related to a new life, intended for a new life in the following fiscal year, is likely to be purchased. The storage unit 43 may store the date information Id acquired by the date information acquisition unit 45 therein.

The provision unit 18 may provide the risk information Ri and the risk handling information Ir on the basis of the date information Id acquired by the date information acquisition unit 45. On the basis of the date information Id, the control unit 20 may control the display unit 30 so that the display unit 30 displays the risk information Ri and the risk handling information Ir. In this way, the display unit 30 is likely to display the risk information Ri and the risk handling information Ir reflecting the purchasing trends (for example, the seasonal characteristics) of the apparatus Ap by the user of the risk information provision device 100.

The date information Id is likely to reflect the acquisition tendency of at least one of the risk information Ri or the risk handling information Ir by the user of the risk information provision device 100. For example, the acquisition tendency is a purchase history of the apparatus Ap by the user from the recipient 52-5 (an electronic commerce company). Therefore, the provision unit 18 provides the risk information Ri on the basis of the date information Id so that the provision unit 18 can provide the risk information Ri to the recipient 52 or the provider 53 that is most appropriate for the user.

Figure 2:
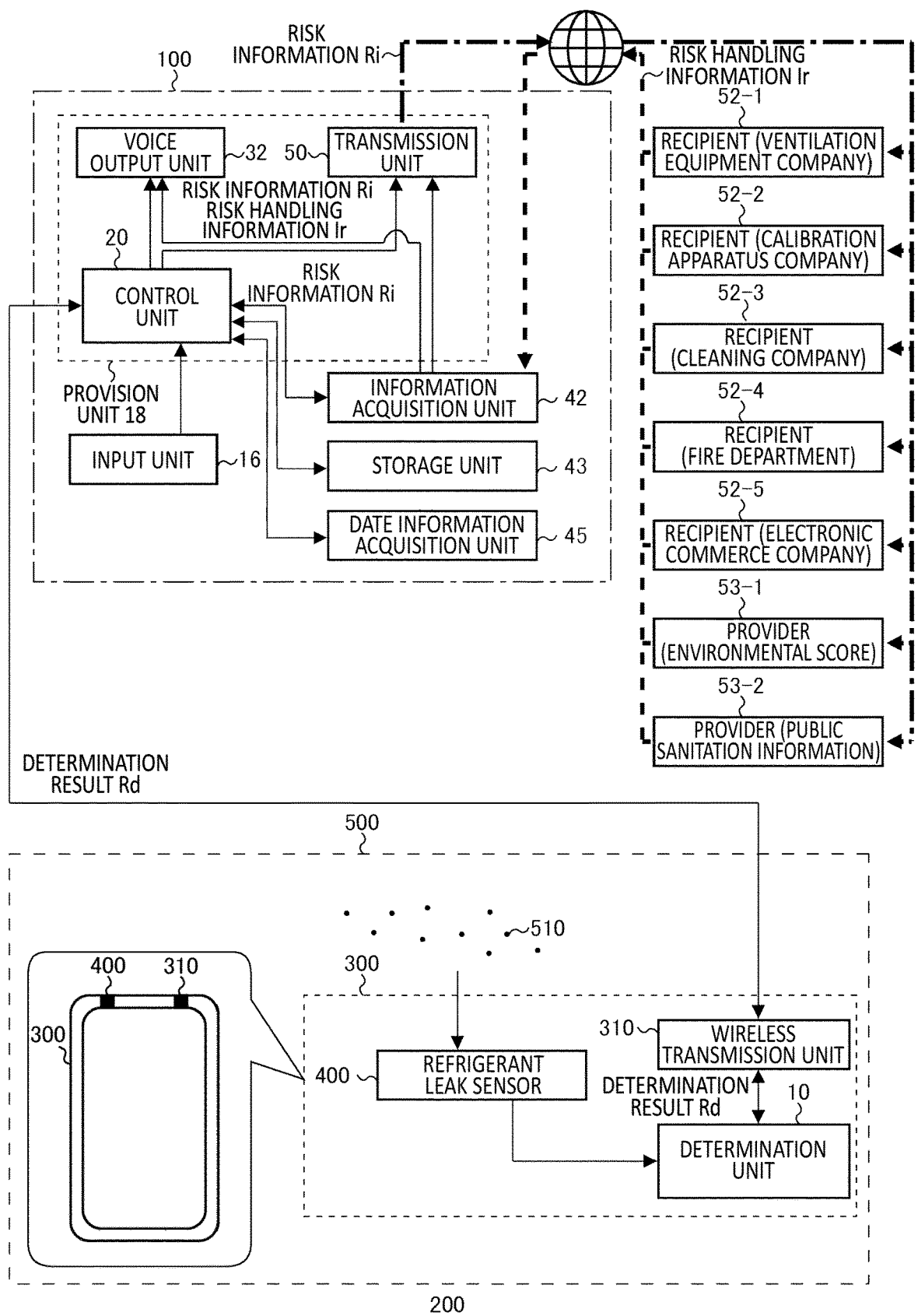
FIG. 2 is a block diagram illustrating another example of the risk information provision system 200 according to an embodiment of the present invention.

FIG. 2 is a block diagram illustrating another example of the risk information provision system 200 according to an embodiment of the present invention. In this example, the provision unit 18 includes a voice output unit 32 instead of the display unit 30. The risk information provision system 200 in this example is different from the risk information provision system 200 illustrated in FIG. 1 in these respects. In this example, the voice output unit 32 outputs the voice according to at least one of the risk information Ri or the risk handling information Ir. The voice output unit 32 may output at least one of the risk information Ri or the risk handling information Ir in a form that can be aurally recognized by a human. The voice output unit 32 is, for example, a speaker.

The control unit 20 may control the voice output unit 32 so that the voice output unit 32 outputs the voice according to at least one of the risk information Ri or the risk handling information Ir. In this example, the provision unit 18 causes the voice output unit 32 to output the voice according to at least one of the risk information Ri and the risk handling information Ir to provide at least one of the risk information Ri or the risk handling information Ir to the user of the risk information provision device 100. In this way, the user of the risk information provision device 100 can know at least one of the risk information Ri or the risk handling information Ir. The voice according to at least one of the risk information Ri or the risk handling information Ir is, for example, the voice indicating that the concentration of the refrigerant 510 in the determination target 500 is an abnormal value.

Figure 3:
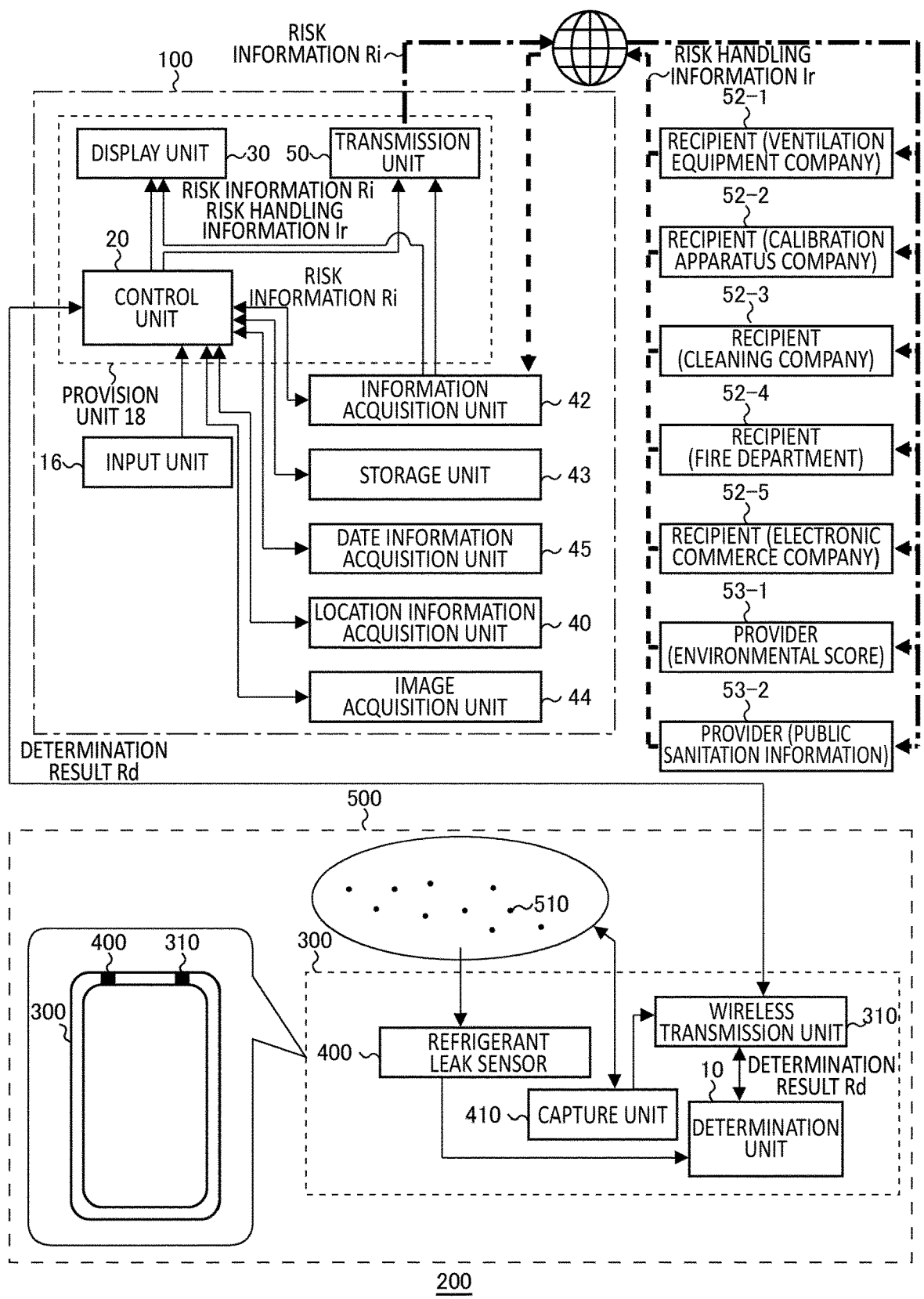
FIG. 3 is a block diagram illustrating another example of the risk information provision system 200 according to an embodiment of the present invention.

FIG. 3 is a block diagram illustrating another example of the risk information provision system 200 according to an embodiment of the present invention. In this example, the risk information provision device 100 further includes a location information acquisition unit 40 and an image acquisition unit 44. The risk information provision system 200 in this example is different from the risk information provision system 200 illustrated in FIG. 1 in these respects.

The location information acquisition unit 40 acquires the location information of the determination target 500. The location information acquisition unit 40 is, for example, the Global Positioning System (GPS). If the risk information provision device 100 is a portable computer such as a tablet, the location information acquisition unit 40 may be the GPS included in the computer. The location information acquisition unit 40 may acquire the location information of the risk information provision device 100.

The provision unit 18 may provide at least one of the risk information Ri or the risk handling information Ir on the basis of the location information of the determination target 500 acquired by the location information acquisition unit 40. In this way, for example, if the risk information Ri is information that the concentration of the refrigerant 510 in the determination target 500 is rapidly approaching an abnormal value, the provision unit 18 can provides the risk information Ri to the recipient 52-1 (air conditioning repair company) which is capable of resolving the abnormal value and is closest to the current location of the determination target 500.

The image acquisition unit 44 acquires the image of the determination target 500. The refrigerant leak detection unit 300 may include a capture unit 410 for capturing the image of the determination target 500. The capture unit 410 is, for example, a camera. The wireless transmission unit 310 may transmit, to the control unit 20, the image of the determination target 500 captured by the capture unit 410. The image acquisition unit 44 may acquire the image of the determination target 500 transmitted to the control unit 20.

The provision unit 18 may provide at least one of the risk information Ri or the risk handling information Ir on the basis of the image acquired by the image acquisition unit 44. In this way, for example, if the image acquired by the image acquisition unit 44 is an image of an abnormal portion which can cause a deviation from the steady concentration of the refrigerant 510 in the determination target 500, the provision unit 18 can provide the risk information Ri to the recipient 52-4 (the seller of the apparatus) that is preferably notified of the abnormality caused by the deviation. The abnormality which can cause a deviation from the steady concentration of the refrigerant 510 is, for example, frost or oil.

The control unit 20 may control the display unit 30 so that the display unit 30 displays at least one of the risk information Ri or the risk handling information Ir on the basis of the image acquired by the image acquisition unit 44. For example, if the image acquired by the image acquisition unit 44 is the image of the abnormal portion which can cause a deviation from the steady concentration of the refrigerant 510 in the determination target 500, the risk handling information Ir provided by a company, which can alleviate the deviation, such as at least one of the recipient 52-1 (air conditioning repair company) or the recipient 52-5 (electronic commerce company) may be displayed on the display unit 30. In this example, the risk handling information Ir is the advertisement information of the ventilation equipment company, the advertisement information of the electronic commerce company, and the like. In this way, the risk information provision device 100 easily prompts the user viewing the display unit 30 to handle the risk on the basis of the risk handling information Ir.

The provision unit 18 may provide at least one of the risk information Ri or the risk handling information Ir on the basis of the image acquired by the image acquisition unit 44 and the location information of the determination target 500 acquired by the location information acquisition unit 40. In this way, for example, if the image acquired by the image acquisition unit 44 is an image of an abnormal portion which can cause a deviation from the steady concentration of the refrigerant 510 in the determination target 500, the provision unit 18 can provide the risk information Ri to the recipient 52-4 (the seller of the apparatus) that is preferably notified of the abnormality caused by the deviation.

The control unit 20 may control the display unit 30 so that the display unit 30 displays at least one of the risk information Ri or the risk handling information Ir on the basis of the image acquired by the image acquisition unit 44 and the location information of the determination target 500 acquired by the location information acquisition unit 40. For example, if the image acquired by the image acquisition unit 44 is the image of the abnormal portion which can cause a deviation from the steady discharge amount of the refrigerant 510 in the determination target 500, the risk handling information Ir (for example, advertisement) provided by the recipient 52 which is a company capable of alleviating the deviation, for example, at least one of the recipient 52-1 (air conditioning repair company) or the recipient 52-5 (electronic commerce company) and is closest to the current location of the risk information provision device 100 may be displayed on the display unit 30.

Figure 4:
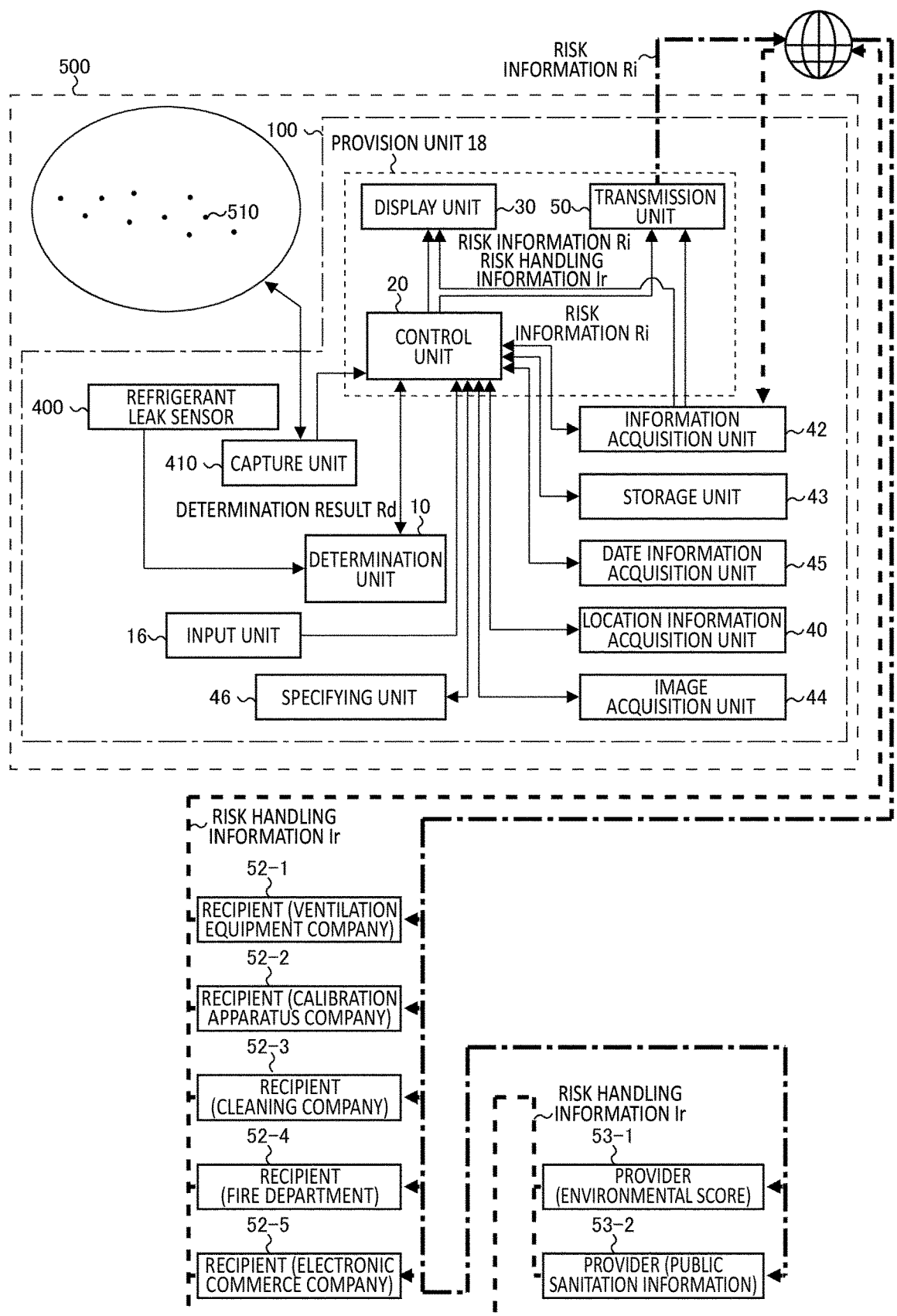
FIG. 4 is a block diagram illustrating an example of a risk information provision device 100 according to an embodiment of the present invention.

FIG. 4 is a block diagram illustrating an example of the risk information provision device 100 according to an embodiment of the present invention. In this example, the risk information provision device 100 includes one or more refrigerant leak sensors 400 and a specifying unit 46. When the risk information provision device 100 includes a plurality of refrigerant leak sensors 400, the plurality of refrigerant leak sensors 400 may be installed apart from each other. The specifying unit 46 specifies an abnormal location in the determination target 500 on the basis of the output of one or more refrigerant leak sensors 400. The specifying unit 46 may specify the abnormal location in the determination target 500 by comparing the output of the plurality of refrigerant leak sensors 400 with each other.

The risk information provision device 100 may include the capture unit 410 for capturing the image of the determination target 500. The image acquisition unit 44 may acquire the image of the determination target 500 captured by the capture unit 410.

In this example, the risk information provision device 100 includes the determination unit 10. In this example, the determination unit 10 determines the status Sd of the leakage of the refrigerant 510 in the determination target 500 on the basis of the concentration of the refrigerant 510 in the determination target 500. The determination unit 10 may output the determination result Rd. The determination unit 10 may be a central processing unit (CPU). The determination unit 10 and the control unit 20 may be one CPU.

The provision unit 18 may provide at least one of the risk information Ri or the risk handling information Ir on the basis of the specific information specified by the specifying unit 46. The specific information may be information indicating that the specifying unit 46 has specified or estimated the abnormal location. When the specifying unit 46 has specified or estimated the abnormal location, the control unit 20 may control the display unit 30 so that the display unit 30 displays the risk information Ri. For example, the risk information Ri is warning information indicating that the concentration of the refrigerant 510 is approaching an abnormal value.

Figure 5:
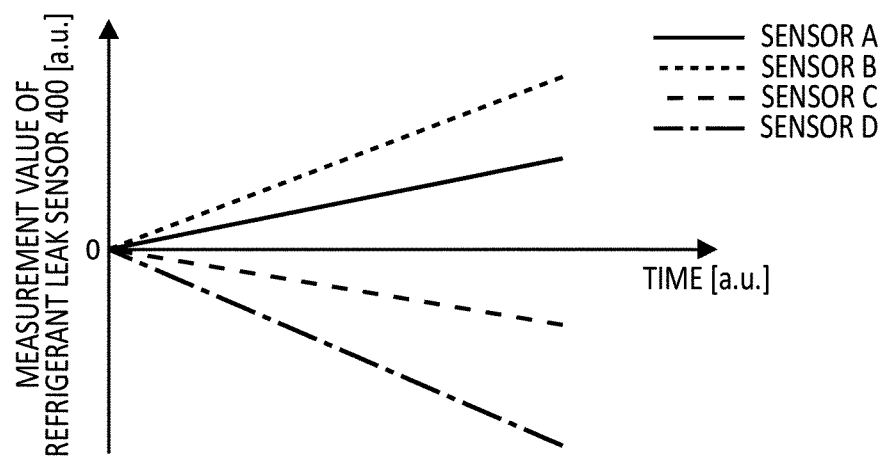
FIG. 5 is a diagram illustrating an example of a relationship between a measurement value measured by a refrigerant leak sensor 400 and time.

FIG. 5 is a diagram illustrating an example of a relationship between a measurement value measured by a refrigerant leak sensor 400 and time. The time illustrated in FIG. 5 may be included in the date information Id. The refrigerant leak sensor 400 may include a plurality of types of sensors. FIG. 5 illustrates an example of the relationship between the measurement value measured by the refrigerant leak sensor 400 and the time for four types of refrigerant leak sensors 400 (sensors A to D).

As described above, the refrigerant leak sensor 400 may be at least one of a combustible gas sensor, an oil sensor, a frost sensor, an abnormal sound sensor, or a power sensor. The type of the refrigerant leak sensor 400 indicates a type (combustible gas, oil, or the like) of a measurement target of the refrigerant leak sensor 400. The relationship between the measurement value measured by the refrigerant leak sensor 400 and the time may vary depending on the type of the refrigerant leak sensor.

A risk index due to refrigerant leak is referred to as a risk index Rx. The risk index Rx is an index related to the possibility of a risk depending on the status Sd of leakage of the refrigerant 510 in the determination target 500, and is an index indicating at least one of the possibility of a risk posed by leakage of the refrigerant 510 to the life of a living body such as a human being, the possibility of a risk of the leakage causing global warming, or the possibility of a risk of the leakage causing a fire. The control unit 20 may calculate the risk index Rx on the basis of the measurement value measured by the refrigerant leak sensor 400 and the normal value of the refrigerant leak. When the refrigerant is a combustible gas, the normal value of the refrigerant leak is a normal value of the concentration of the combustible gas. The control unit 20 may calculate the risk index Rx on the basis of a difference between the measurement value measured by the refrigerant leak sensor 400 and the normal value of the refrigerant leak. The risk index Rx may include the date information Id. The control unit 20 may predict the status Sd of the leakage of the refrigerant 510 on the basis of the date information Id included in the risk index Rx.

Figure 6:
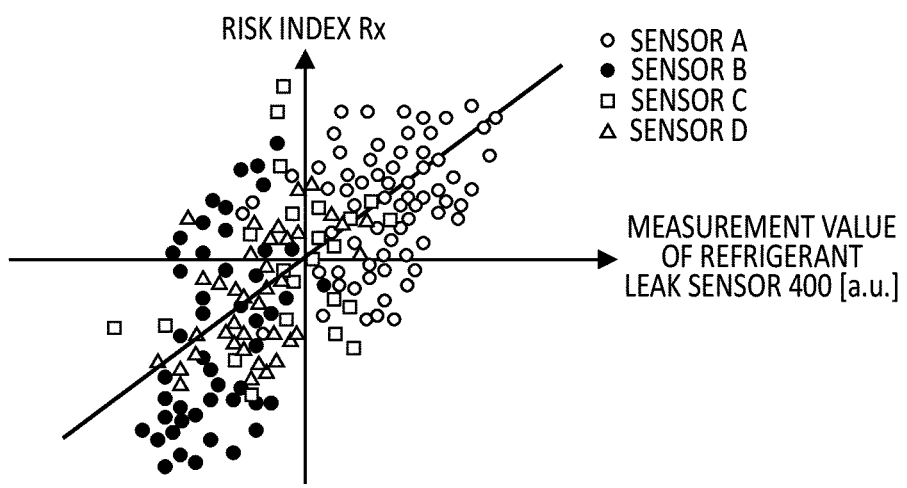
FIG. 6 is a diagram illustrating an example of a correlation between the measurement value measured by the refrigerant leak sensor 400 and a risk index Rx.

FIG. 6 is a diagram illustrating an example of a correlation between the measurement value measured by the refrigerant leak sensor 400 and the risk index Rx. FIG. 6 illustrates an example of a correlation between the risk index Rx and each of the measurement values obtained by a plurality of types of refrigerant leak sensors 400. The control unit 20 may calculate the risk index Rx corresponding to one measurement value measured by one type of the refrigerant leak sensors 400 on the basis of the correlation between the risk index Rx and a plurality of types of measurement values measured by the plurality of types of refrigerant leak sensors 400. A white circle in FIG. 6 indicates a measurement value of one type of refrigerant leak sensor 400 (sensor A), a black circle indicates a measurement value of another type of refrigerant leak sensor 400 (sensor B), a square indicates a measurement value of still another type of refrigerant leak sensor 400 (sensor C), and a triangle indicates a measurement value of still another type of refrigerant leak sensor 400 (sensor D).

Figure 7:
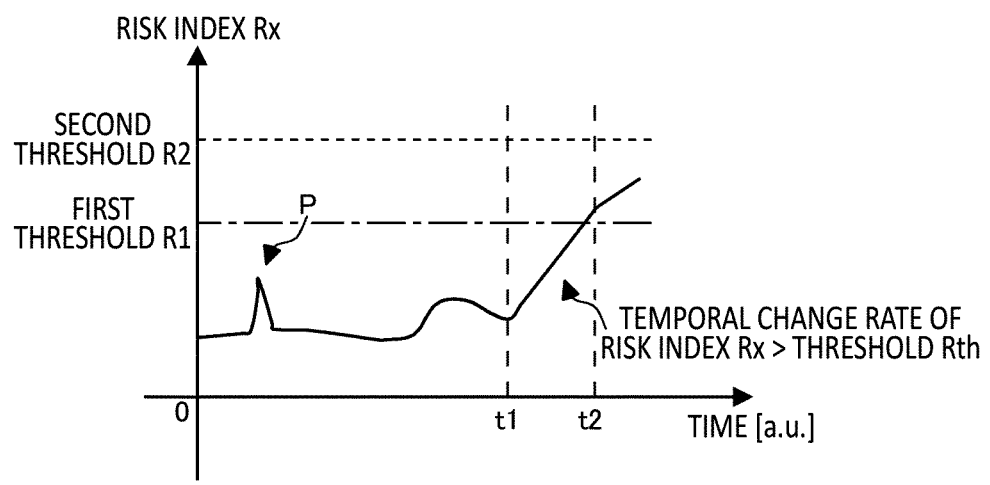
FIG. 7 is a diagram illustrating an example of a relationship between the risk index Rx and time.

FIG. 7 is a diagram illustrating an example of a relationship between the risk index Rx and the time. The time illustrated in FIG. 7 may be included in the date information Id. The risk index Rx in FIG. 7 may be the measurement value measured by the refrigerant leak sensor 400. The control unit 20 may determine a magnitude relationship between a temporal change rate in the risk index Rx and a threshold of a predetermined temporal change rate. The threshold is referred to as a threshold Rth. In the example of FIG. 7, it is assumed that the temporal change rate in the risk index Rx is larger than the threshold Rth between time t1 and time t2. When it is determined that the temporal change rate in the risk index Rx is larger than the threshold Rth, the provision unit 18 may provide at least one of the risk information Ri or the risk handling information Ir, and may provide, as the risk information Ri, information indicating that there is a risk due to the leakage of the refrigerant 510.

When it is determined that the temporal change rate in the risk index Rx is larger than the threshold Rth, the control unit 20 may measure time indicating a temporal change rate larger than the threshold Rth, and may determine a magnitude relationship between the time and threshold time. The threshold time is referred to as threshold time RT. When it is determined that the time during which the risk index Rx indicates the temporal change rate larger than the threshold Rth is larger than the threshold time RT, the provision unit 18 may provide at least one of the risk information Ri or the risk handling information Ir, and may provide, as the risk information Ri, information indicating that there is a risk due to the leakage of the refrigerant 510.

In the temporal change of the risk index Rx, a sudden temporal change may occur as in a peak P illustrated in FIG. 7. When it is determined that the time during which the risk index Rx indicates the temporal change rate larger than the threshold Rth is equal to or less than the threshold time RT, the provision unit 18 may provide at least one of the risk information Ri or the risk handling information Ir. A case where it is determined that the time during which the risk index Rx indicates the temporal change rate larger than the threshold Rth is equal to or less than the threshold time RT is, for example, the case of the peak P illustrated in FIG. 7.

A first threshold and a second threshold of the risk index Rx are referred to as a first threshold R1 and a second threshold R2, respectively. The second threshold R2 is equal to or larger than the first threshold R1. The second threshold R2 is a threshold indicating an abnormality of the risk index Rx. When the risk index Rx is larger than the second threshold R2, the risk index Rx is determined to be an abnormal value. The first threshold R1 is a threshold indicating that the risk index Rx is a normal value but is close to the second threshold R2. The first threshold R1 may be the risk index Rx having a magnitude of a warning level or may be a management reference value of the risk index Rx.

The control unit 20 may determine a magnitude relationship between the risk index Rx and the first threshold R1. When it is determined that the risk index Rx is larger than the first threshold R1, the provision unit 18 may provide at least one of the risk information Ri or the risk handling information Ir, and may provide, as the risk information Ri, information indicating that there is a risk due to the leakage of the refrigerant 510. When it is determined that the temporal change rate in the risk index Rx is larger than the threshold Rth, and it is determined that the risk index Rx is the first threshold R1, the provision unit 18 may provide at least one of the risk information Ri or the risk handling information Ir, and may provide, as the risk information Ri, information indicating that there is a risk due to the leakage of the refrigerant 510.

The control unit 20 may acquire an elapsed time from the determination that the risk index Rx is larger than the first threshold R1. The control unit 20 may determine a magnitude relationship between the elapsed time from the determination that the risk index Rx is larger than the first threshold R1 and a threshold of the elapsed time. The elapsed time is referred to as an elapsed time T, and a threshold of the elapsed time T is referred to as a threshold Rt. When it is determined that the elapsed time T is equal to or longer than the threshold Rt, the provision unit 18 may provide at least one of the risk information Ri or the risk handling information Ir, and may provide, as the risk information Ri, information indicating that there is a risk due to the leakage of the refrigerant 510. When it is determined that the temporal change rate in the risk index Rx is larger than the threshold Rth, it is determined that the risk index Rx is the first threshold R1, and it is determined that the elapsed time T is equal to or longer than the threshold Rt, the provision unit 18 may provide at least one of the risk information Ri or the risk handling information Ir, and may provide, as the risk information Ri, information indicating that there is a risk due to the leakage of the refrigerant 510.

The control unit 20 may update the risk handling information Ir on the basis of at least one of the risk information Ri or the date information Id. The provision unit 18 may provide the updated risk handling information Ir. In this way, the user of the risk information provision device 100 can take an action for handling the risk on the basis of the latest risk handling information Ir.

The control unit 20 may update the recipient information Isp on the basis of at least one of the risk information Ri and the date information Id. The recipient information Isp is information related to the recipient 52 which receives the risk information Ri. In this way, the provision unit 18 can easily provide the risk information Ri to an appropriate recipient 52.

The information acquisition unit 42 may acquire time information related to the business hours of the recipient 52. The provision unit 18 may select the recipient 52 on the basis of the time information. The provision unit 18 may select the recipient 52 during the business hours. The provision unit 18 may provide the risk information Ri to the selected recipient 52. In this way, the provision unit 18 easily and reliably provides the risk information Ri to the recipient 52.

The information related to the apparatus Ap may include at least one of a defect history or a maintenance history of the apparatus Ap. The defect of the apparatus Ap may refer to a case where the apparatus operates abnormally, and may refer to a failure state of the apparatus. The defect history of the apparatus Ap may include a defect of the apparatus Ap for each season. The provision unit 18 may provide the risk information Ri to the recipient 52 on the basis of at least one of the defect history or the maintenance history of the apparatus Ap. In this way, the provision unit 18 can easily provide the risk information Ri to a more appropriate recipient 52. The provision unit 18 easily provides, to the recipient 52, the risk handling information Ir for handling the defect of the apparatus Ap for each season. The provider 53 which provides the risk handling information Ir can easily provide, to the recipient 52, the service according to the season or the climate according to the season.

Figure 8:
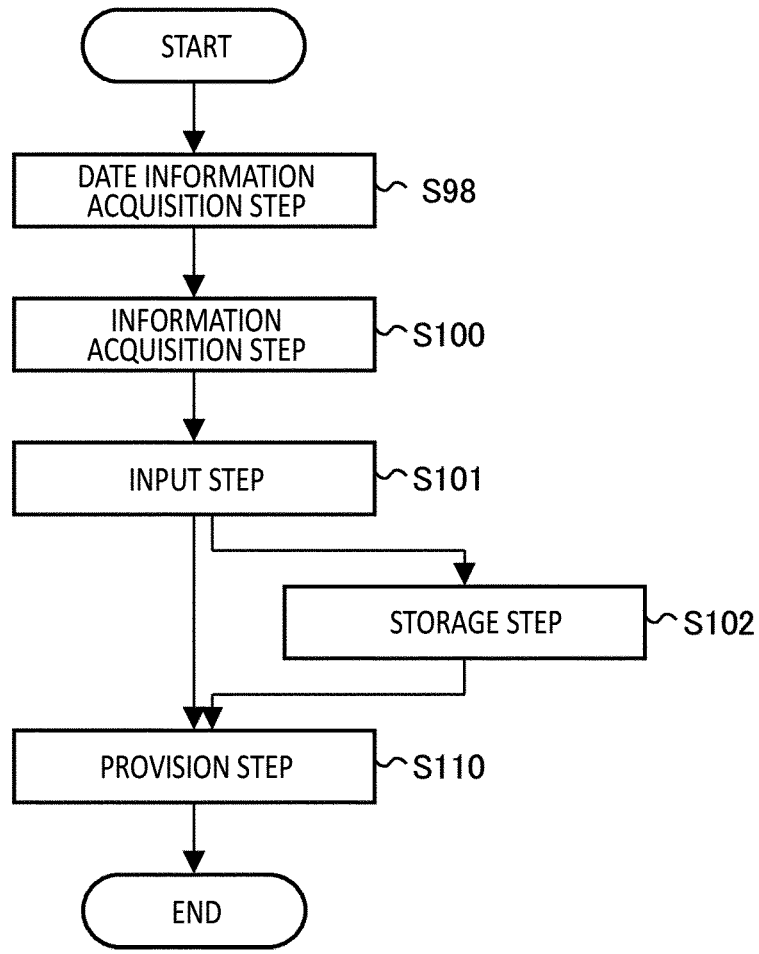
FIG. 8 is a flowchart illustrating an example of a risk information provision method according to an embodiment of the present invention.

FIG. 8 is a flowchart illustrating an example of a risk information provision method according to an embodiment of the present invention. The risk information provision method according to an embodiment of the present invention is described with reference to the risk information provision system 200 illustrated in FIG. 1 as an example. The risk information provision method includes a date information acquisition step S98, an information acquisition step S100, and a provision step S110.

The date information acquisition step S98 is a step of acquiring, by the date information acquisition unit 45, the date information Id of the date on which the risk information Ri and the risk handling information Ir are acquired. The information acquisition step S100 is a step of acquiring, by the information acquisition unit 42, the risk information Ri related to the risk depending on the status Sd of the leakage of the refrigerant 510 in the determination target 500 and the risk handling information Ir for handling the risk. The status Sd is determined on the basis of the concentration of the refrigerant 510 in the determination target 500. The provision step S110 is a step of providing, by the provision unit 18, at least one of the risk information Ri or the date information Id. The risk handling information Ir includes the recipient information Isp related to the recipient 52 (see FIG. 1) which receives the risk information Ri.

The provision step S110 may be a step of providing, by the provision unit 18 (see FIG. 1), the risk information Ri to the recipient 52 (see FIG. 1) on the basis of the input information, which is input by the input unit 16 on the basis of the risk handling information Ir, related to the risk handling.

The provision step S110 may be a step of controlling, by the control unit 20, the display unit 30 so that the display unit 30 displays at least one of the risk information Ri or the risk handling information Ir. In this way, the user of the risk information provision method can know at least one of the risk information Ri or the risk handling information Ir.

The provision step S110 may be a step of controlling, by the control unit 20, the transmission unit 50 so that the transmission unit 50 transmits the risk information Ri. The risk information Ri may be transmitted to the recipient 52 via the Internet line. In this way, the recipient 52 can know the risk information Ri.

The risk information provision method may further include an input step of inputting, by the input unit 16 (see FIG. 1), the input information before the provision step S110.

The provision step S110 may be a step of, when at least one of the additional risk information Ria or the additional risk handling information Ira is input, providing, by the provision unit 18, at least one of the risk information Ri or the risk handling information Ir on the basis of at least one of the additional risk information Ria or the additional risk handling information Ira. As described above, the additional risk information Ria may be risk information noticed by the user of the risk information provision device 100 in addition to the status Sd determined on the basis of the concentration of the refrigerant 510. The additional risk handling information Ira may be the risk handling information realized by the user of the risk information provision device 100 besides the risk handling information Ir acquired by the information acquisition unit 42, as described above.

The risk handling information Ir may include recipient information Isp related to a recipient which receives the risk information Ri. The provision step S110 is a step of, when the input unit 16 inputs handling the risk on the basis of the risk handling information Ir or when it is permitted to handle the risk, providing, by the provision unit 18, the risk information Ri to the recipient 52. Inputting handling a risk on the basis of the risk handling information Ir means that a request for repair to the recipient 52-1 is input in order to resolve the risk (for example, the abnormal value of the concentration of the refrigerant 510 when the risk handling information Ir is advertisement information provided by the recipient 52-1 (air conditioning repair company). The same is also applied to a case where it is permitted to handle the risk.

The provision step S110 may be a step of providing, by the provision unit 18, the recipient information Isp on the basis of at least one of the location information of the recipient 52, the service charge information of the recipient 52, delivery date information, or advertising fee payment information.

The risk information Ri may include information related to temporal changes in the concentration of the refrigerant 510. The provision step S110 may be a step of providing, by the provision unit 18, at least one of the risk information Ri or the risk handling information Ir to at least one recipient 52 of the plurality of recipients 52 on the basis of the information related to the temporal change in the concentration of the refrigerant 510.

The risk information Ri may include information related to the type of the refrigerant 510. The provision step S110 may be a step of providing, by the provision unit 18, at least one of the risk information Ri or the risk handling information Ir to at least one recipient 52 of the plurality of recipients 52 on the basis of the information related to the type of the refrigerant 510.

The risk information Ri may include information related to the concentration of the refrigerant 510. The provision step S110 may be a step of providing, by the provision unit 18, at least one of the risk information Ri or the risk handling information Ir to at least one recipient 52 of the plurality of recipients 52 on the basis of the information related to the concentration of the refrigerant 510.

The risk information provision method may further include an input step S101 of inputting, by the input unit 16, the input information. The input step S101 may precede the provision step S110. The risk information provision method may further include a storage step S102.

The provision step S110 may be a step of providing, by the provision unit 18, at least one of the risk information Ri or the risk handling information Ir on the basis of the provision history of the risk information Ri and the risk handling information Ir.

The storage step S102 is a step of storing, by the storage unit 43, the provision history of the risk information Ri and the risk handling information Ir provided by the provision unit 18. The provision step S110 may be a step of providing, by the provision unit 18, at least one of the risk information Ri or the risk handling information Ir on the basis of the provision history, which is stored in the storage step S102, of the risk information Ri and the risk handling information Ir.

For the risk information provision method in this example, the provision step S110 is likely to provide the risk handling information Ir and the risk information Ri having a high probability of being most appropriate, because the risk handling information Ir is provided on the basis of the provision history of the risk information Ri and the risk handling information Ir.

The risk handling information Ir may include the information related to the apparatus Ap for handling the risk. As described above, for example, the apparatus Ap for handling the risk is, when the concentration of the refrigerant 510 (see FIG. 1) in the determination target 500 is approaching an abnormal value, a ventilation apparatus for resolving the abnormal value.

The information acquisition step S100 may be a step of further acquiring, by the information acquisition unit 42, the information, which is provided by the recipient 52 (see FIG. 1), related to the apparatus Ap. The provision step S110 may be a step of providing, by the provision unit 18, at least one of the risk information Ri or the risk handling information Ir on the basis of the acquisition history of the information related to the apparatus Ap. The storage step S102 may be a step of further storing the acquisition history of the information related to the apparatus Ap acquired by the information acquisition unit 42. The provision step S110 may be a step of providing, by the provision unit 18, at least one of the risk information Ri or the risk handling information Ir on the basis of the acquisition history, which is stored in the storage step S102, of the information related to the apparatus Ap.

For the risk information provision method in this example, the provision step S110 is likely to provide the risk handling information Ir and the risk information Ri having a high probability of being most appropriate, because at least one of the risk information Ri or the risk handling information Ir is provided on the basis of the acquisition history of the information related to the apparatus Ap.

The provision step S110 may be a step of providing, by the provision unit 18, at least one of the risk information Ri or the risk handling information Ir on the basis of the browsing history of the information related to the apparatus Ap. The storage step S102 may be a step of further storing, by the storage unit 43, the browsing history of the information related to the apparatus Ap acquired by the information acquisition unit 42. In this way, the provision step S110 is likely to provide at least one of the risk information Ri or the risk handling information Ir on the basis of the browsing history of the information related to the apparatus Ap. The provision step S110 may be a step of providing, by the provision unit 18, at least one of the risk information Ri or the risk handling information Ir on the basis of the browsing history, which is stored in the storage step S102, of the information related to the apparatus Ap.

The information acquisition step S100 may be a step of acquiring the risk information Ri and the risk handling information Ir on the basis of the date information Id acquired in the date information acquisition step S98. The provision step S110 may be a step of providing the risk information Ri and the risk handling information Ir.

For the risk information provision method in this example, the risk information Ri and the risk handling information Ir are acquired on the basis of the date information Id in the information acquisition step S100 and the risk information Ri and the risk handling information Ir are provided in the provision step S110. In this way, the risk information Ri and the risk handling information Ir reflecting the purchasing trends (for example, the seasonal characteristics) of the apparatus Ap by the user of the risk information provision device 100 is likely to be provided.

The storage step S102 may be a step of further storing the date information Id acquired in the date information acquisition step S98. The provision step S110 may be a step of providing, by the provision unit 18, at least one of the risk information Ri or the risk handling information Ir on the basis of the date information Id stored in the storage step S102.

For the risk information provision method in this example, because at least one of the risk information Ri or the risk handling information Ir is provided on the basis of the date information Id in the provision step S110, the risk information Ri is likely to be provided to the recipient 52 or the provider 53 (see FIG. 1) that is most appropriate for the user of the risk information provision device 100.

Figure 9:
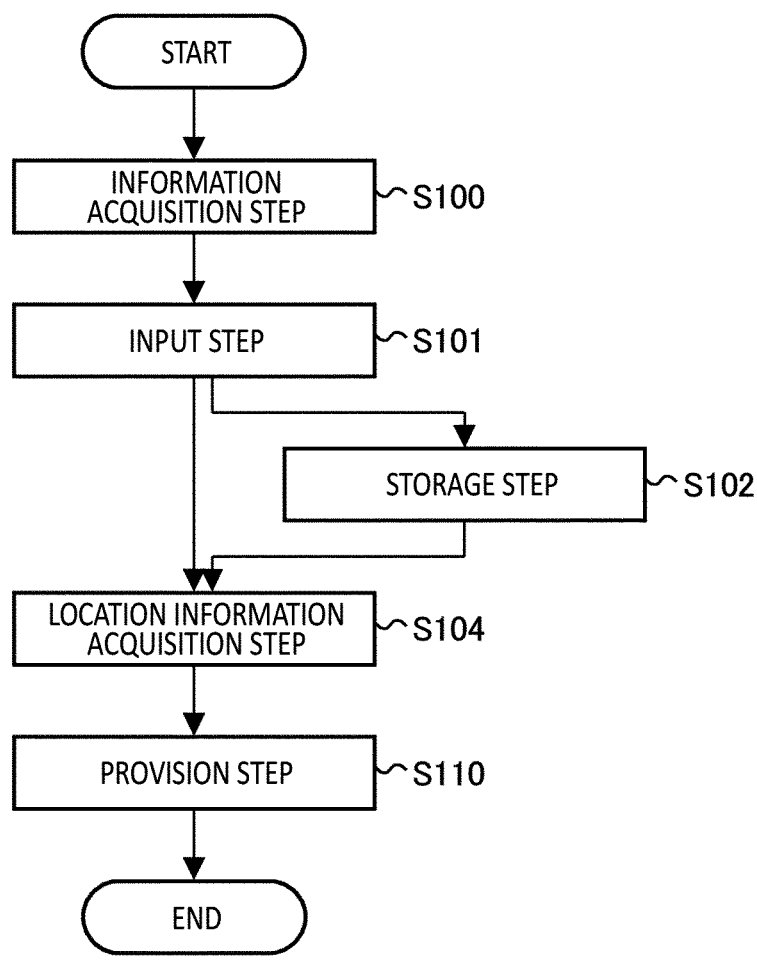
FIG. 9 is a flowchart illustrating another example of the risk information provision method according to an embodiment of the present invention.

FIG. 9 is a flowchart illustrating another example of the risk information provision method according to an embodiment of the present invention. The risk information provision method in this example is different from the risk information provision method illustrated in FIG. 8 in that it further includes the location information acquisition step S104. The risk information provision method illustrated in FIG. 9 is described with reference to the risk information provision system 200 illustrated in FIG. 3 as an example.

The location information acquisition step S104 is a step of acquiring, by the location information acquisition unit 40, the location information of the determination target 500. The provision step S110 may be a step of providing, by the provision unit 18, at least one of the risk information Ri or the risk handling information Ir on the basis of the location information of the determination target 500.

For the risk information provision method in this example, the risk information Ri is provided on the basis of the location information of the determination target 500 in the provision step S110. Therefore, for example, if the risk information Ri depending on the status Sd is the risk information Ri depending on the status Sd indicating that the concentration of the refrigerant 510 is approaching an abnormal value, in the provision step S110, the risk information Ri is more likely to be provided to the recipient 52-1 (air conditioning repair company) closest to the current location of the determination target 500.

Figure 10:
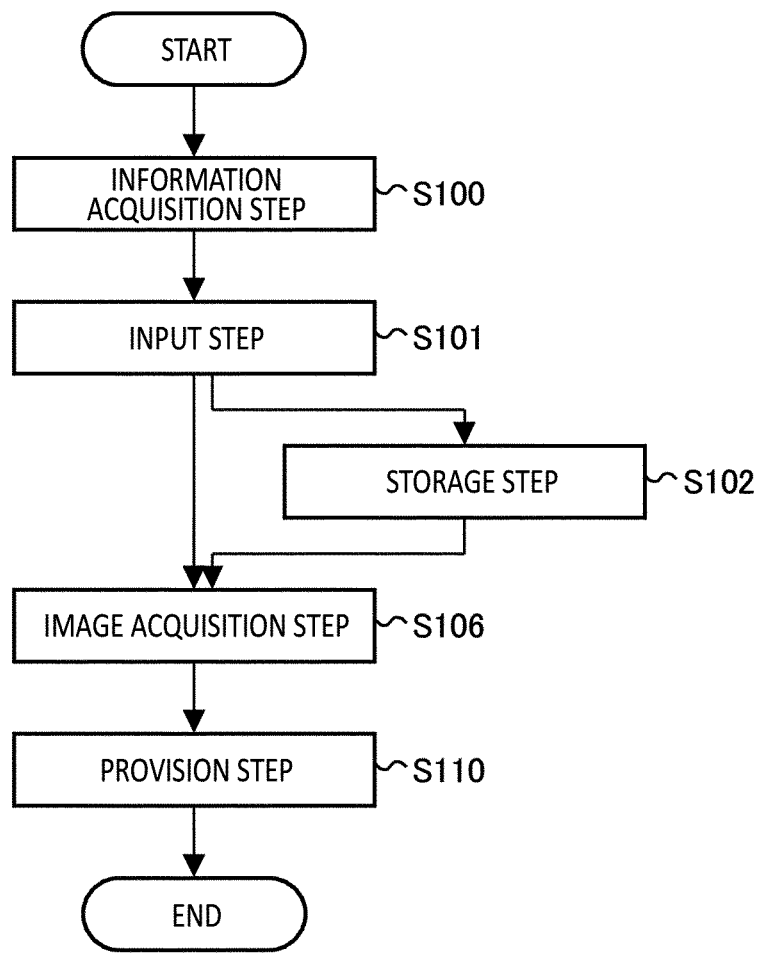
FIG. 10 is a flowchart illustrating another example of the risk information provision method according to an embodiment of the present invention.

FIG. 10 is a flowchart illustrating another example of the risk information provision method according to an embodiment of the present invention. The risk information provision method in this example is different from the risk information provision method illustrated in FIG. 8 in that it further includes the image acquisition step S106. The risk information provision method illustrated in FIG. 10 is described with reference to the risk information provision system 200 illustrated in FIG. 3 as an example.

The image acquisition step S106 is a step of acquiring, by the image acquisition unit 44, the image of the determination target 500. The provision step S110 may be a step of providing, by the provision unit 18, at least one of the risk information Ri or the risk handling information on the basis of the image of the determination target 500 acquired in the image acquisition step S106.

For the risk information provision method in this example, the risk information Ri is provided on the basis of the image of the determination target 500 in the provision step S110. In this way, for example, if the image acquired in the image acquisition step S106 is in a state which can cause a deviation from the steady concentration of the refrigerant 510 in the determination target 500, in the provision step S110, the risk information Ri is more likely to be provided to the recipient 52-4 (the seller of the apparatus) that is preferably notified of the abnormality caused by the deviation. The state which can cause a deviation from the steady concentration of the refrigerant 510 is, for example, frost or oil.

Figure 11:
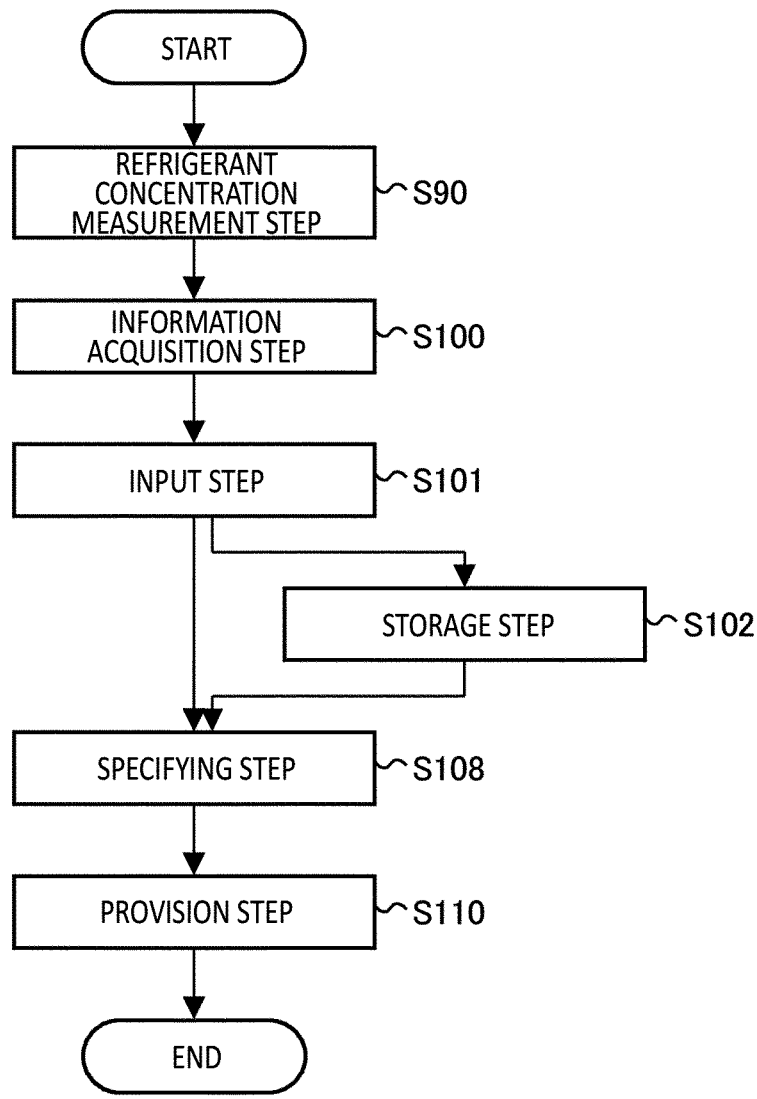
FIG. 11 is a flowchart illustrating another example of the risk information provision method according to an embodiment of the present invention.

FIG. 11 is a flowchart illustrating another example of the risk information provision method according to an embodiment of the present invention. The risk information provision method of this example is different from the risk information provision method illustrated in FIG. 8 in that it further includes a refrigerant concentration measurement step S90 and a specifying step S108. The risk information provision method illustrated in FIG. 11 is described with reference to the risk information provision device 100 illustrated in FIG. 4 as an example.

The refrigerant concentration measurement step S90 is a step of measuring, by the refrigerant leak sensor 400, the concentration of the refrigerant 510 in the determination target 500. The specifying step S108 is a step of specifying an abnormal location in the determination target 500 on the basis of the output of the plurality of refrigerant leak sensors 400. The specifying step S108 may be a step of specifying or estimating the abnormal location in the determination target 500 by comparing the output of the plurality of refrigerant leak sensors 400 with each other. The refrigerant leak sensor 400 may be at least one of a combustible gas sensor, an oil sensor, a frost sensor, an abnormal sound sensor, or a power sensor. The specifying step S108 may be a step of specifying the abnormal location in the determination target 500 on the basis of the output of at least one of the combustible gas sensor, the oil sensor, the frost sensor, the abnormal sound sensor, or the power sensor.

Figure 12:
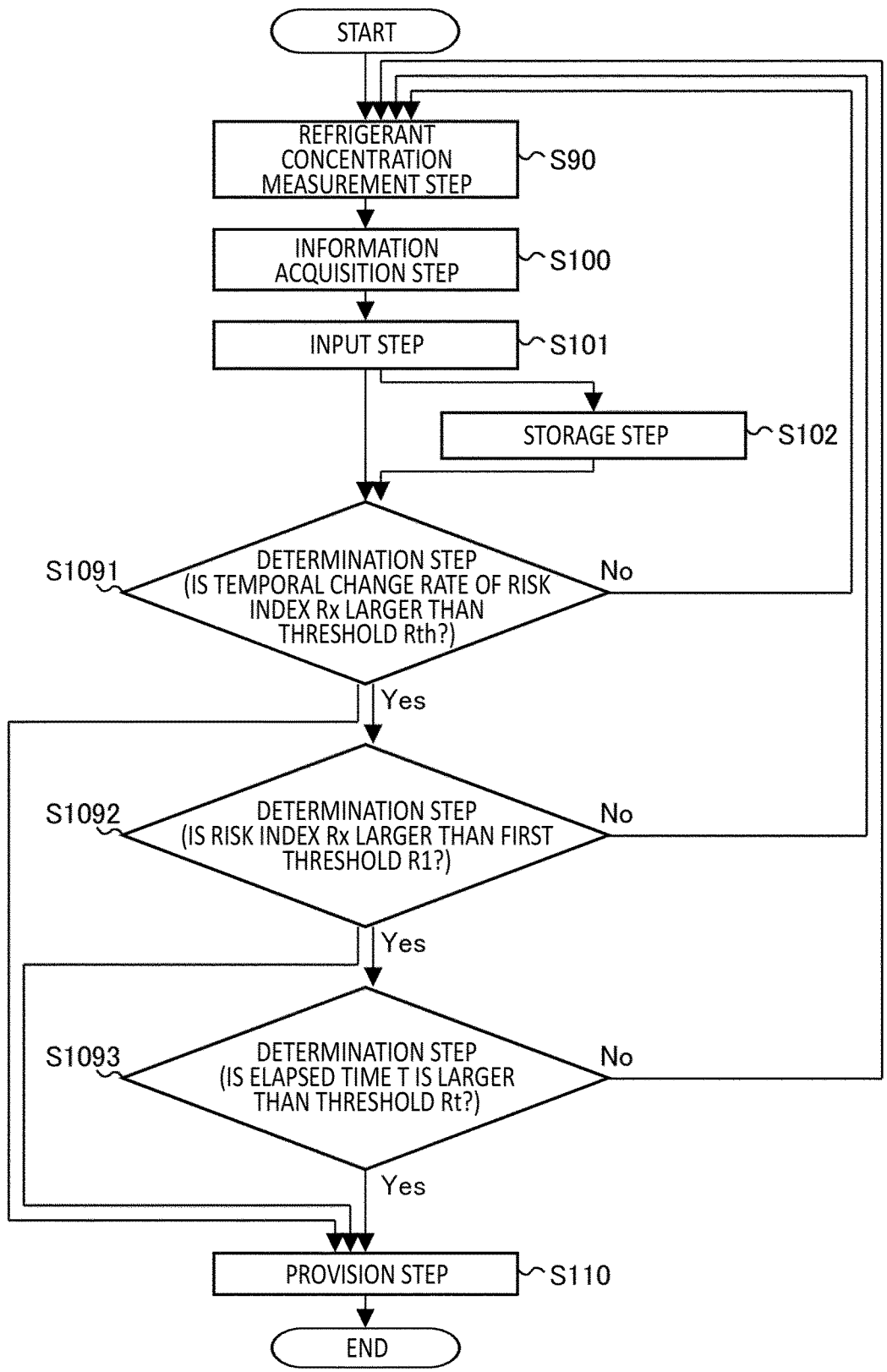
FIG. 12 is a flowchart illustrating another example of the risk information provision method according to an embodiment of the present invention.

FIG. 12 is a flowchart illustrating another example of the risk information provision method according to an embodiment of the present invention. The risk information provision method of this example is different from the risk information provision method illustrated in FIG. 11 in that it further includes a determination step S1091, a determination step S1092, and a determination step S1093. The risk information provision method illustrated in FIG. 12 will be described with reference to the risk information provision device 100 illustrated in FIG. 4 as an example.

The determination step S1091 is a step of determining, by the control unit 20, the magnitude relationship between the temporal change rate in the risk index Rx and the threshold Rth of the temporal change rate. When it is determined that the temporal change rate in the risk index Rx is larger than the threshold Rth, the risk information provision method proceeds to the determination step S1092 or the provision step S110. The provision step S110 may be a step of providing, by the provision unit 18, at least one of the risk information Ri or the risk handling information Ir, and may be a step of providing, as the risk information Ri, information indicating that there is a risk due to the leakage of the refrigerant 510. When it is not determined that the temporal change rate in the risk index Rx is larger than the threshold Rth, the risk information provision method returns to the refrigerant concentration measurement step S90.

The determination step S1092 is a step of determining, by the control unit 20, the magnitude relationship between the risk index Rx and the first threshold R1. When it is determined that the risk index Rx is larger than the first threshold R1, the risk information provision method proceeds to the determination step S1093 or the provision step S110. When it is not determined that the risk index Rx is larger than the first threshold R1, the risk information provision method returns to the refrigerant concentration measurement step S90.

The determination step S1093 is a step of determining, by the control unit 20, the magnitude relationship between the elapsed time T from the determination that the risk index Rx is larger than the first threshold R1 and the threshold Rt of the elapsed time T. When it is determined that the elapsed time T is equal to or longer than the threshold Rt, the risk information provision method proceeds to the determination step S1093. When it is not determined that the elapsed time T is equal to or longer than the threshold Rt, the risk information provision method returns to the refrigerant concentration measurement step S90.

Various embodiments of the present invention may be described with reference to flowcharts and block diagrams. According to the various embodiments of the present invention, a block may represent (1) a step of a process where operations are executed or (2) a section of an apparatus having a role for executing operations.

A specific step may be executed by a dedicated circuit, a programmable circuit, or a processor. A specific section may be implemented by a dedicated circuit, a programmable circuit, or a processor. The programmable circuit and the processor may be supplied together with a computer-readable instruction. The computer-readable instruction may be stored on a computer-readable medium.

The dedicated circuit may include at least one of a digital hardware circuit or an analog hardware circuit. The dedicated circuit may include at least one of an integrated circuit (IC) or a discrete circuit. The programmable circuit may include a hardware circuit of logical AND, logical OR, logical XOR, logical NAND, logical NOR, or other logical operations. The programmable circuit may include a reconfigurable hardware circuit including a flip-flop, a register, a memory element such as a field programmable gate array (FPGA) and a programmable logic array (PLA), and the like.

A computer-readable medium may include any tangible device that can store instructions to be executed by a suitable device. Since the computer-readable medium includes the tangible device, the computer-readable medium having the instruction stored on the device constitutes a product including an instruction that may be executed in order to provide means to execute an operation specified by a flowchart or a block diagram.

The computer-readable medium may be, for example, an electronic storage medium, a magnetic storage medium, an optical storage medium, an electromagnetic storage medium, a semiconductor storage medium, or the like. More specifically, for example, the computer-readable medium may be a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include any of an assembler instruction, an instruction-set-architecture (ISA) instruction, a machine instruction, a machine dependent instruction, a microcode, a firmware instruction, state-setting data, a source code, and an object code. The source code and the object code may be written in any combination of one or more programming languages including an object oriented programming language and a procedural programming language in related art. The object oriented programming language may be, for example, Smalltalk (registered trademark), JAVA (registered trademark), C++, or the like. The procedural programming language may be, for example, a "C" programming language.

The computer-readable instruction may be provided to a general purpose computer, a special purpose computer, or a processor or a programmable circuit of another programmable data processing apparatus locally or via a local area network (LAN) or a wide area network (WAN) such as the Internet. The processor or programmable circuit of a general purpose computer, a special purpose computer, or another programmable data processing apparatus may execute a computer-readable instruction in order to make means for performing the operation specified in the flowchart illustrated in FIG. 8 to FIG. 12 or the block diagram illustrated in FIG. 1 to FIG. 4. The processor may be, for example, a computer processor, a processing unit, a microprocessor, a digital signal processor, a controller, a microcontroller, or the like.

Figure 13:
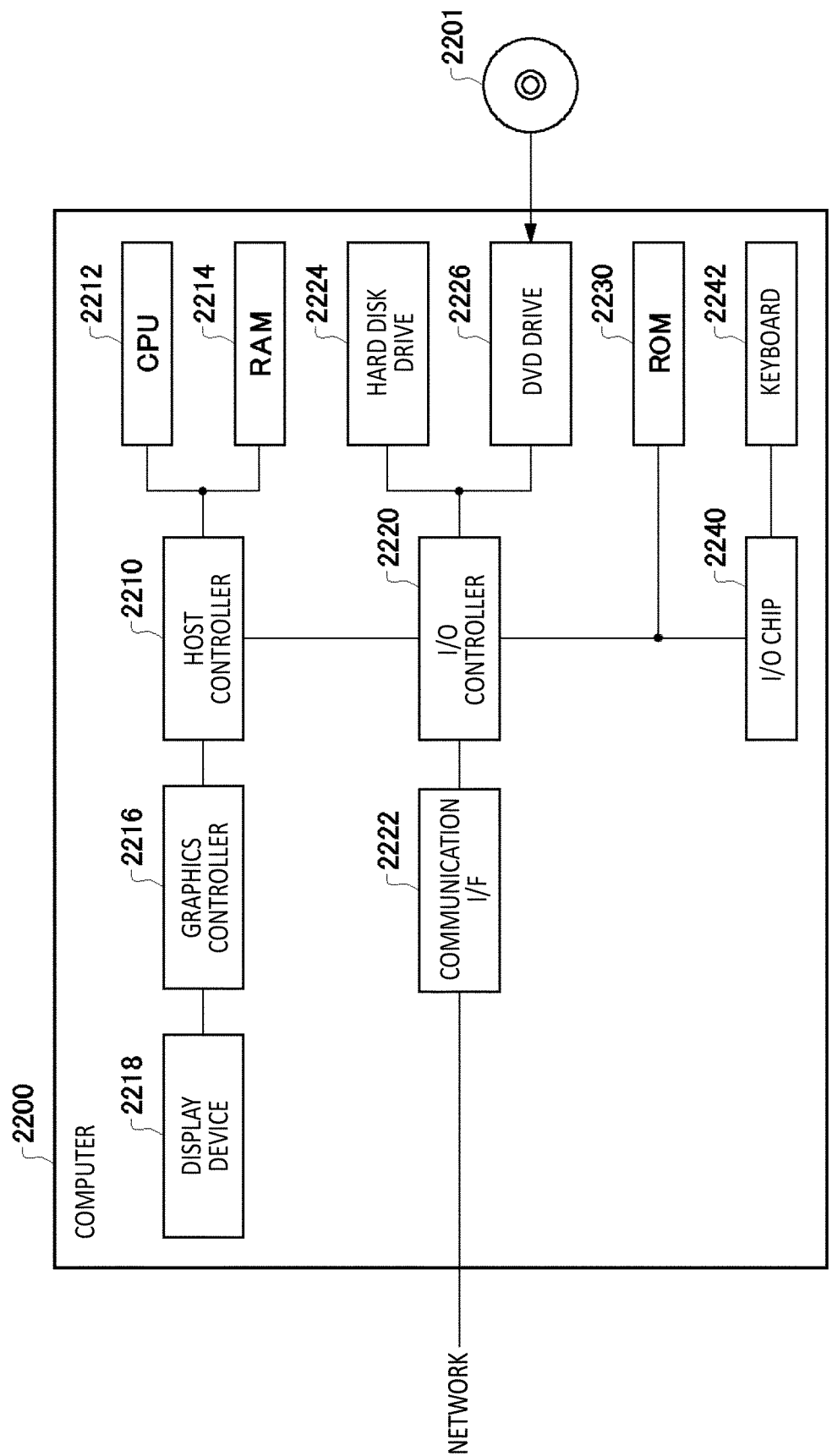
FIG. 13 is a diagram illustrating an example of a computer 2200 in which the risk information provision device 100 according to an embodiment of the present invention may be embodied in whole or in part.

FIG. 13 is a diagram illustrating an example of a computer 2200 in which the risk information provision device 100 according to an embodiment of the present invention may be embodied in whole or in part. The program installed in the computer 2200 can cause the computer 2200 to function as the operation associated with the risk information provision device 100 according to an embodiment of the present invention or one or more sections of the risk information provision device 100, or to perform the operation or the one or more section, or cause the computer 2200 to perform each step according to the risk information provision method of the present invention (see FIG. 8 to FIG. 12). The program may be performed by the CPU 2212 in order to cause the computer 2200 to perform a particular operation associated with some or all of the blocks in the flowchart (FIG. 8 to FIG. 12) and the block diagram (FIG. 1 to FIG. 4) described in this specification.

The computer 2200 according to an embodiment of the present invention includes a CPU 2212, a RAM 2214, a graphics controller 2216, and a display device 2218. The CPU 2212, the RAM 2214, the graphics controller 2216, and the display device 2218 are mutually connected by a host controller 2210. The computer 2200 further includes input and output units such as a communication interface 2222, a hard disk drive 2224, a DVD-ROM drive 2226, and an IC card drive. The communication interface 2222, the hard disk drive 2224, the DVD-ROM drive 2226, and the IC card drive, and the like are connected to the host controller 2210 via an input and output controller 2220. The computer further includes legacy input and output units such as a ROM 2230 and a keyboard 2242. The ROM 2230, the keyboard 2242, and the like are connected to the input and output controller 2220 through an input and output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the RAM 2214 itself to cause the image data to be displayed on the display device 2218.

The communication interface 2222 communicates with other electronic devices via a network. The hard disk drive 2224 stores programs and data used by the CPU 2212 in the computer 2200. The DVD-ROM drive 2226 reads the programs or the data from the DVD-ROM 2201, and provides the read programs or data to the hard disk drive 2224 via the RAM 2214. The IC card drive reads programs and data from an IC card, or writes programs and data to the IC card.

The ROM 2230 stores a boot program or the like executed by the computer 2200 at the time of activation, or a program depending on the hardware of the computer 2200. The input and output chip 2240 may connect various input and output units via a parallel port, a serial port, a keyboard port, a mouse port, or the like to the input and output controller 2220.

The program is provided by a computer-readable medium such as the DVD-ROM 2201 or the IC card. The program is read from a computer-readable medium, installed in the hard disk drive 2224, the RAM 2214, or the ROM 2230 which are also examples of the computer-readable medium, and executed by the CPU 2212. The information processing described in these programs is read by the computer 2200 and provides cooperation between the programs and various types of hardware resources. An apparatus or method may be constituted by realizing the operation or processing of information in accordance with the usage of the computer 2200.

For example, when a communication is performed between the computer 2200 and an external device, the CPU 2212 may execute a communication program loaded onto the RAM 2214 to instruct communication processing to the communication interface 2222, on the basis of the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

The CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like. The CPU 2212 may perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search or replace of information, or the like, as described throughout the present disclosure and designated by an instruction sequence of programs. The CPU 2212 may write the result back to the RAM 2214.

The CPU 2212 may search for information in a file, a database, or the like in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, read the attribute value of the second attribute stored in the entry, and read a second attribute value to obtain the attribute value of the second attribute associated with the first attribute satisfying the predetermined condition.

The above-explained program or software modules may be stored in the computer-readable media on the computer 2200 or of the computer 2200. A recording medium such as a hard disk or a RAM provided in a server system connected to a dedicated communication network or the Internet can be used as the computer-readable media. The program may be provided to the computer 2200 by the recording medium.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

EXPLANATION OF REFERENCES

10: determination unit;
16: input unit;
18: provision unit;
20: control unit;
30: display unit;
32: voice output unit;
40: location information acquisition unit;
42: information acquisition unit;
43: storage unit;
44: image acquisition unit;
45: date information acquisition unit;
46: specifying unit;
50: transmission unit;
52: recipient;
53: provider;
100: risk information provision device;
200: risk information provision system;
300: refrigerant leak detection unit;
310: wireless transmission unit;
400: refrigerant leak sensor;
410: capture unit;
500: determination target;
510: refrigerant;
2200: computer;
2201: DVD-ROM;
2210: host controller;
2212: CPU;
2214: RAM;
2216: graphic controller;
2218: display device;
2220: input/output controller;
2222: communication interface;
2224: hard disk drive;
2226: DVD-ROM drive;
2230: ROM;
2240: input/output chip; and
2242: keyboard.

What is claimed is:

1. A risk information provision device comprising:
an information acquisition unit configured to acquire risk information related to a risk depending on a status of leakage of a refrigerant in a determination target and risk handling information for handling the risk, wherein the status of the leakage of the refrigerant is determined on a basis of a concentration of the refrigerant in the determination target;
a provision unit configured to provide at least one of the risk information or the risk handling information;

a date information acquisition unit configured to acquire date information of a date on which at least one of the risk information or the risk handling information is acquired;

a location information acquisition unit configured to acquire location information of the determination target; and a control unit configured to calculate a risk index related to a possibility of the risk depending on the status of the leakage of the refrigerant in the determination target, wherein the risk information includes information related to a type of the refrigerant, the risk handling information includes recipient information related to one or more recipients that receive the risk information, the provision unit is configured to provide at least one of the risk information or the risk handling information to at least one recipient among the one or more recipients on a basis of the information related to the type of the refrigerant included in the risk information, the provision unit is configured to provide at least one of the risk information or the risk handling information to a recipient, set on a basis of a distance between the recipient and the acquired location information of the determination target, among the one or more recipients, the risk information includes information related to temporal changes in the concentration of the refrigerant, the control unit is configured to:
 determine whether a temporal change rate of the risk index is larger than a predetermined first threshold; and
 when the temporal change rate of the risk index is determined to be larger than the first threshold, determine whether an elapsed time from it is determined that the temporal change rate of the risk index is larger than the first threshold is larger than a predetermined second threshold, and when it is determined that the elapsed time is larger than the second threshold, the provision unit is configured to provide at least one of the risk information or the risk handling information to at least one recipient among the one or more recipients.

2. The risk information provision device according to claim 1, wherein
 the risk information includes information related to the concentration of the refrigerant, and
 the provision unit is configured to provide at least one of the risk information or the risk handling information to at least one recipient among the one or more recipients on a basis of the information related to the concentration of the refrigerant.

3. The risk information provision device according to claim 1, further comprising
 an input unit configured to input input information to the provision unit, wherein
 the provision unit is configured to provide the risk information to the one or more recipients on a basis of the input information, which is input by the input unit on a basis of the risk handling information, related to risk handling.

4. The risk information provision device according to claim 1, wherein
 the provision unit is configured to provide at least one of the risk information or the risk handling information on a basis of a provision history of the risk information and the risk handling information.

5. The risk information provision device according to claim 1, wherein
 the risk handling information includes information related to an apparatus for handling the risk,
 the information acquisition unit is configured to further acquire information, which is provided by the one or more recipients, related to the apparatus, and
 the provision unit is configured to provide at least one of the risk information or the risk handling information on a basis of an acquisition history, which is acquired by the information acquisition unit, of the information related to the apparatus.

6. The risk information provision device according to claim 1, wherein
 the provision unit is configured to provide at least one of the risk information or the risk handling information on a basis of the date information.

7. The risk information provision device according to claim 1, further comprising
 an image acquisition unit configured to acquire an image of the determination target, wherein
 the provision unit is configured to provide at least one of the risk information or the risk handling information on a basis of the image acquired by the image acquisition unit.

8. The risk information provision device according to claim 1, further comprising:
 one or more refrigerant leak sensors configured to measure the leakage of the refrigerant in the determination target; and
 a specifying unit configured to specify an abnormal location in the determination target on a basis of output of the one or more refrigerant leak sensors, wherein
 at least one of the risk information or the risk handling information is provided on a basis of specific information specified by the specifying unit.

9. The risk information provision device according to claim 8, wherein the one or more refrigerant leak sensors are at least one of a combustible gas sensor, an oil sensor, a frost sensor, an abnormal sound sensor or a power sensor.

10. A risk information provision system comprising
 the risk information provision device according to claim 1, wherein
 at least one of the risk information or the risk handling information is transmitted to a refrigerant leak detection unit.

11. A risk information provision device comprising:
 an information acquisition unit configured to acquire risk information related to a risk depending on a status of leakage of a refrigerant in a determination target and risk handling information for handling the risk, wherein the status of the leakage of the refrigerant is determined on a basis of a concentration of the refrigerant in the determination target;
 a provision unit configured to provide at least one of the risk information or the risk handling information;
 a date information acquisition unit configured to acquire date information of a date on which at least one of the risk information or the risk handling information is acquired;
 a location information acquisition unit configured to acquire location information of the determination target; and
 a control unit configured to calculate a risk index related to a possibility of the risk depending on the status of the leakage of the refrigerant in the determination target, wherein the risk information includes information related to a type of the refrigerant, the risk handling information includes recipient information related to one or more recipients that receive the risk information, the provision unit is configured to provide at least one of the risk information or the risk handling information to at least one recipient among the one or more recipients on a basis of the information related to the type of the refrigerant included in the risk information, the risk information includes information predicted from at least one of a past failure history or a maintenance history of at least one of the determination target or an apparatus having a function similar to a function of the determination target, when no abnormality is found in the status of the leakage of the refrigerant in the determination target and when there is a treatment method predicted from the past failure history or the maintenance history of the apparatus having the function similar to the function of the determination target, the information acquisition unit is configured to acquire, via a network, the risk handling information including the predicted treatment method, the provision unit is configured to provide the risk handling information including the predicted treatment method acquired via the network, the provision unit is configured to provide at least one of the risk information or the risk handling information to a recipient, among the one or more recipients, closest to the determination target on a basis of the acquired location information of the determination target, the risk information includes information related to temporal changes in the concentration of the refrigerant, the control unit is configured to:
  determine whether a temporal change rate of the risk index is larger than a predetermined first threshold; and
  when the temporal change rate of the risk index is determined to be larger than the first threshold, determine whether an elapsed time from it is determined that the temporal change rate of the risk index is larger than the first threshold is larger than a predetermined second threshold, and when it is determined that the elapsed time is larger than the second threshold, the provision unit is configured to provide at least one of the risk information or the risk handling information to at least one recipient among the one or more recipients.

12. A risk information provision device comprising:

an information acquisition unit configured to acquire risk information related to a risk depending on a status of leakage of a refrigerant in a determination target and risk handling information for handling the risk, wherein the status of the leakage of the refrigerant is determined on a basis of a concentration of the refrigerant in the determination target;

a provision unit configured to provide at least one of the risk information or the risk handling information;

a date information acquisition unit configured to acquire date information of a date on which at least one of the risk information or the risk handling information is acquired;

a location information acquisition unit configured to acquire location information of the determination target; and a control unit configured to calculate a risk index related to a possibility of the risk depending on the status of the leakage of the refrigerant in the determination target, wherein the risk information includes information related to a type of the refrigerant, the risk handling information includes recipient information related to one or more recipients that receive the risk information, the provision unit is configured to provide at least one of the risk information or the risk handling information to at least one recipient among the one or more recipients on a basis of the information related to the type of the refrigerant included in the risk information, the risk information includes a provision history related to information on the risk depending on the status of the leakage of the refrigerant in the determination target and information on which of the one or more recipients is provided with the risk information, the risk handling information includes a provision history related to information for handling the risk depending on the status of the leakage of the refrigerant in the determination target and information on from which of the one or more recipients the risk handling information is provided, the provision unit is configured to provide at least one of the risk information or the risk handling information on a basis of the provision history of the risk information or the provision history of the risk handling information, the provision unit is configured to provide at least one of the risk information or the risk handling information to a recipient, among the one or more recipients, closest to the determination target on a basis of the acquired location information of the determination target, the risk information includes information related to temporal changes in the concentration of the refrigerant, the control unit is configured to:
  determine whether a temporal change rate of the risk index is larger than a predetermined first threshold; and
  when the temporal change rate of the risk index is determined to be larger than the first threshold, determine whether an elapsed time from it is determined that the temporal change rate of the risk index is larger than the first threshold is larger than a predetermined second threshold, and when it is determined that the elapsed time is larger than the second threshold, the provision unit is configured to provide at least one of the risk information or the risk handling information to at least one recipient among the one or more recipients.

* * * * *